US011209092B2

(12) United States Patent
Iwabuchi

(10) Patent No.: US 11,209,092 B2
(45) Date of Patent: Dec. 28, 2021

(54) VACUUM GATE VALVE

(71) Applicant: Kitz SCT Corporation, Tokyo (JP)

(72) Inventor: Toshiaki Iwabuchi, Ohta (JP)

(73) Assignee: KITZ SCT CORPORATION, Tokyo (JP)

( * ) Notice: Subject to any disclaimer, the term of this patent is extended or adjusted under 35 U.S.C. 154(b) by 205 days.

(21) Appl. No.: 16/581,827

(22) Filed: Sep. 25, 2019

(65) Prior Publication Data

US 2020/0096127 A1    Mar. 26, 2020

(30) Foreign Application Priority Data

Sep. 26, 2018 (JP) .............................. JP2018-180649
Aug. 9, 2019 (JP) .............................. JP2019-147617

(51) Int. Cl.
*F16K 17/04* (2006.01)
*F16K 51/02* (2006.01)
(Continued)

(52) U.S. Cl.
CPC .......... *F16K 17/0433* (2013.01); *F16K 1/303* (2013.01); *F16K 3/184* (2013.01); *F16K 51/02* (2013.01)

(58) Field of Classification Search
CPC ...... F16K 17/0433; F16K 51/02; F16K 1/303; F16K 3/184; F16K 31/122; F16K 3/18; F16K 3/04; F16K 3/0245; F16K 3/0218; F16K 3/0281; F16K 3/182; F16K 3/314; F16K 3/316; F16K 3/3165; H01L 21/67126
(Continued)

(56) References Cited

U.S. PATENT DOCUMENTS 5,626,324 A * 5/1997 Nakamura ................ F16K 3/18
                                                                  251/158
6,095,180 A * 8/2000 Ishigaki ................ F16K 49/002
                                                                  137/341
(Continued)

FOREIGN PATENT DOCUMENTS

| JP | 5533839 | 6/2014 |
|---|---|---|
| JP | 5545152 | 7/2014 |
| JP | 2018-71642 | 5/2018 |

*Primary Examiner* — Umashankar Venkatesan
*Assistant Examiner* — Andrew J Rost
(74) *Attorney, Agent, or Firm* — Wenderoth, Lind & Ponack, L.L.P.

(57) ABSTRACT

A compact vacuum gate valve capable of reducing a kink and sliding between a seal material and a seal surface, achieving a low occurrence of particles, stably and reliably performing valve-body open-close movements, restricting impulsive sound and vibrations, and also having high durability. The vacuum gate valve includes housing bodies, a valve-body open/close driving body, and a stem provided with a valve body. Each of the housing bodies has therein a piston rod and a cam member with a cam groove. On each side of the valve-body open/close driving body, a cam roller and a fulcrum roller are provided. On an inner side of the housing body, a vertical movement guiding part and a stopper part are provided. A spring for causing the valve-body open/close driving body to ascend is provided between the valve-body open/close driving body and a fixed base part on a fixed side.

5 Claims, 16 Drawing Sheets

(51) Int. Cl.
  *F16K 1/30* (2006.01)
  *F16K 3/18* (2006.01)
(58) Field of Classification Search
  USPC .......................................................... 251/326
  See application file for complete search history.

(56) References Cited

U.S. PATENT DOCUMENTS

| | | | |
|---|---|---|---|
| 6,237,892 B1* | 5/2001 | Ito | F16K 3/184 |
| | | | 251/193 |
| 7,066,443 B2* | 6/2006 | Ishigaki | F16K 51/02 |
| | | | 251/195 |
| 7,234,679 B2* | 6/2007 | Ishigaki | F16K 51/02 |
| | | | 251/114 |
| 7,735,804 B2* | 6/2010 | Chu | F16K 3/184 |
| | | | 251/204 |
| 8,382,066 B2* | 2/2013 | Nagao | H01L 21/67126 |
| | | | 251/204 |
| 8,474,791 B2* | 7/2013 | Ogawa | F16K 3/184 |
| | | | 251/203 |
| 8,800,956 B2* | 8/2014 | Ishigaki | F16K 3/16 |
| | | | 251/58 |
| 9,404,589 B2* | 8/2016 | Ishigaki | F16K 51/02 |
| 9,995,402 B2* | 6/2018 | Kim | F16K 3/3165 |
| 10,364,901 B2* | 7/2019 | Iwabuchi | F16K 51/02 |

\* cited by examiner

Fig. 3 (A)
Fig. 3 (B)
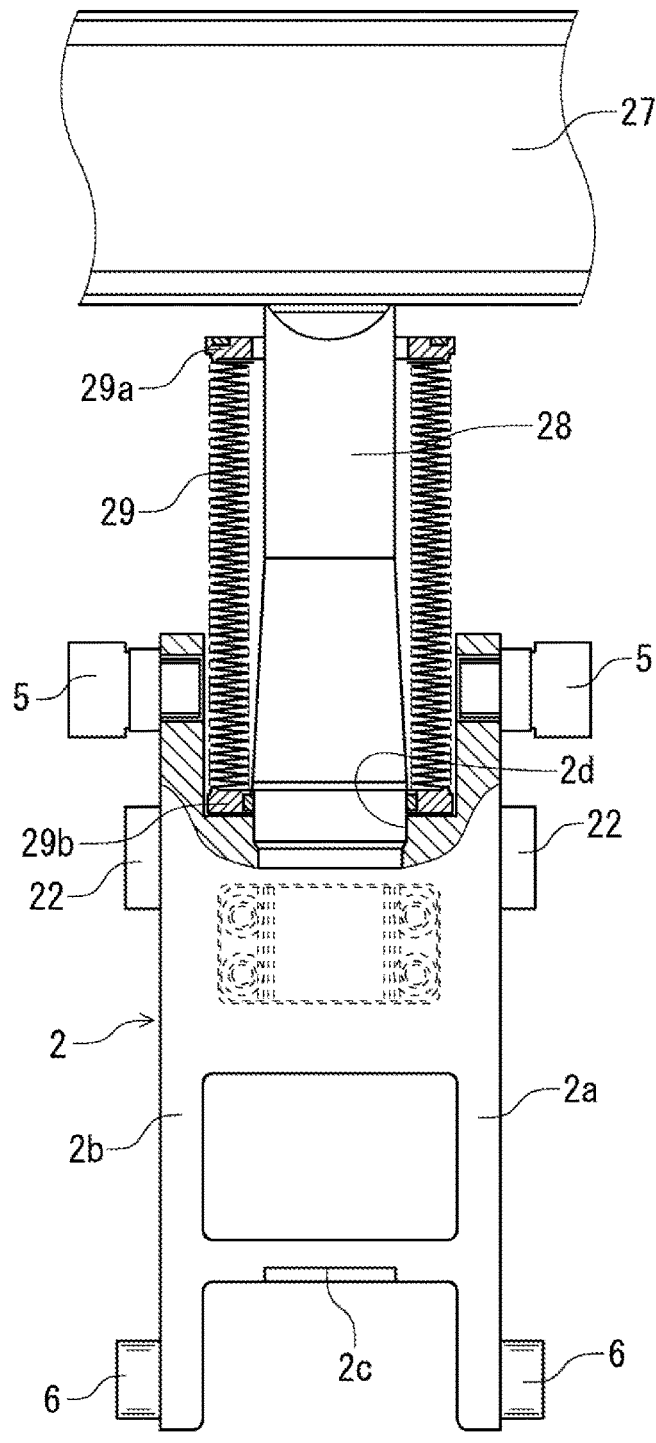
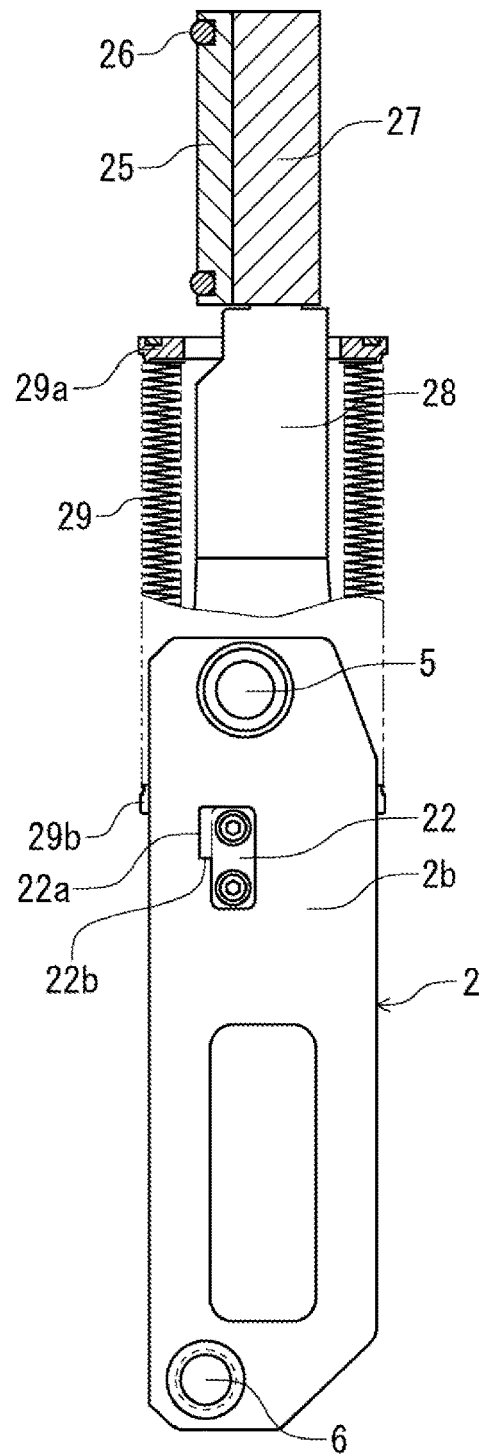

Fig. 7 (A)  Fig. 7 (B)  Fig. 7 (C)
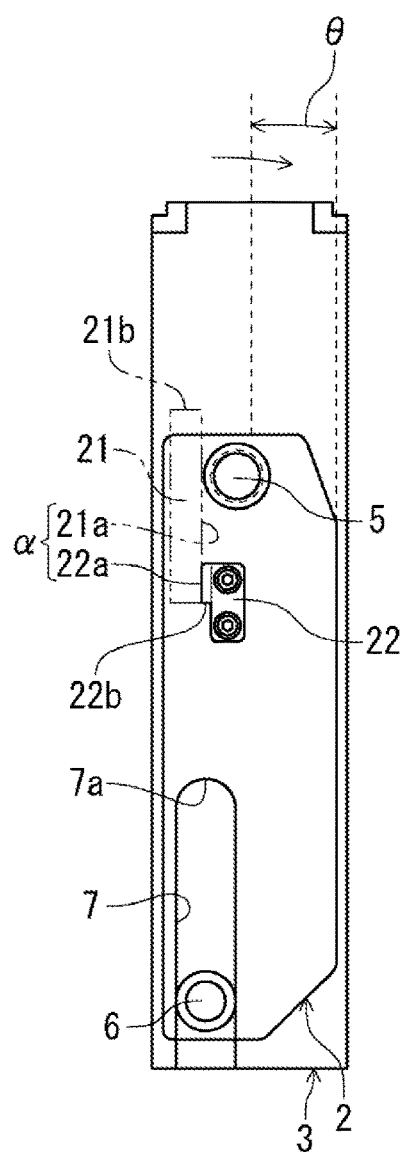
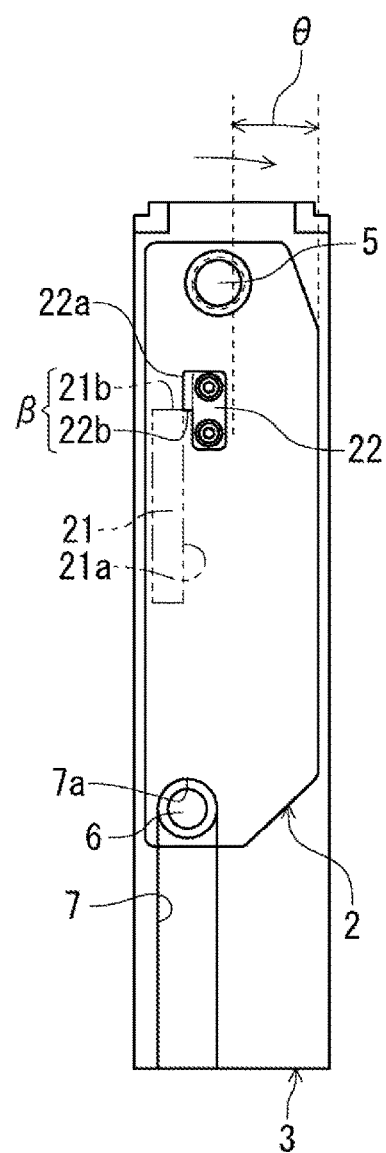
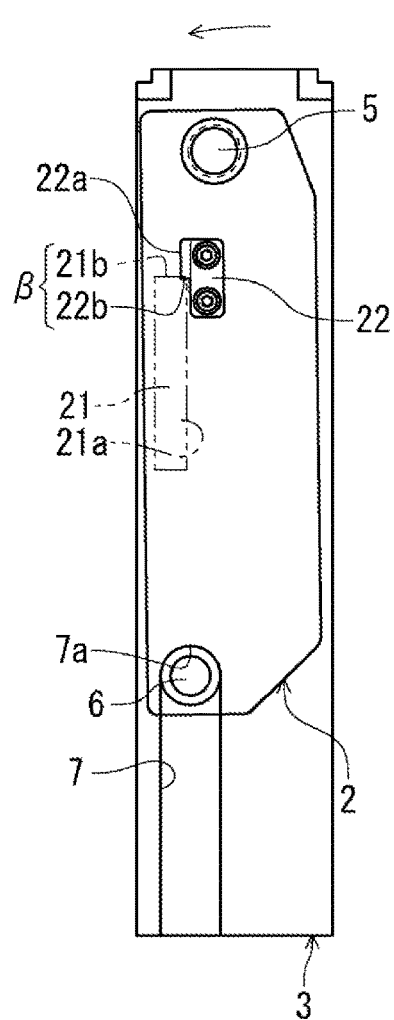

Fig. 8 (A)  Fig. 8 (B)  Fig. 8 (C)
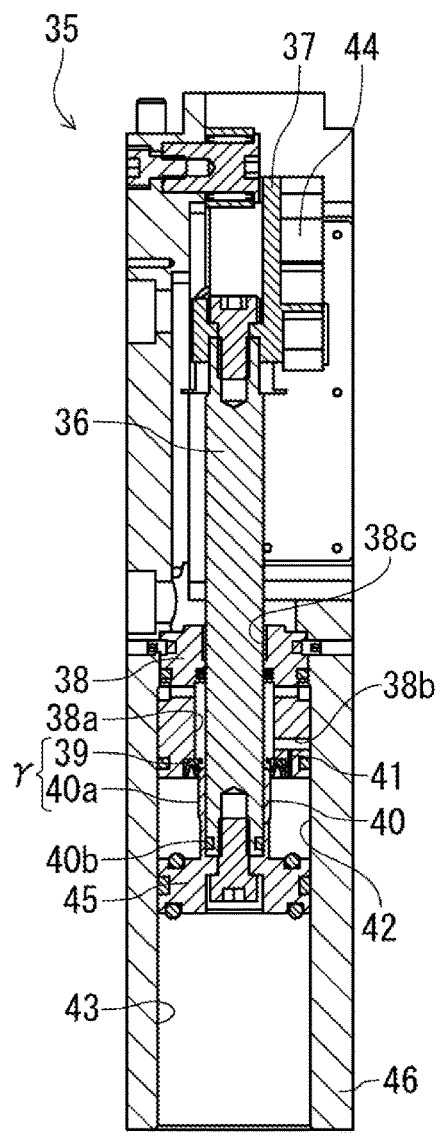
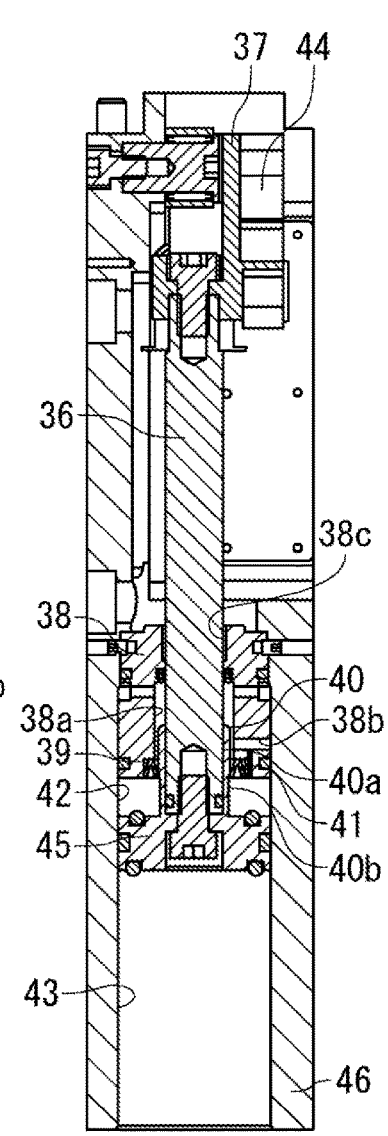
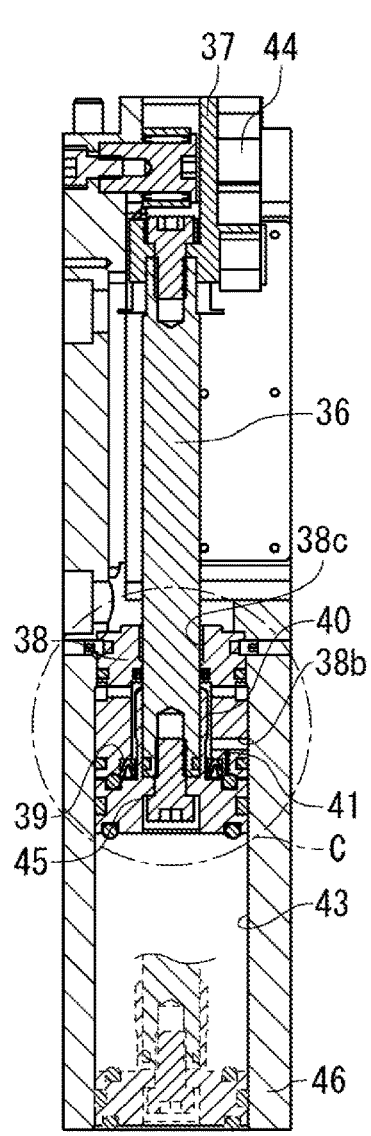

VACUUM GATE VALVE

BACKGROUND OF THE INVENTION

Field of the Invention

The present invention relates to a non-sliding vacuum gate valve for, for example, a semiconductor manufacturing apparatus, having a driving mechanism (actuator) in a thin, simple structure and allowing high-speed stable movements of a valve body.

Description of the Related Art

In general, in a semiconductor manufacturing apparatus, for example, as a gate valve for opening and closing a wafer carrier passage to a vacuum chamber, a vacuum gate valve including a long-square-shaped valve body and so forth has been used. In particular, if a kink, sliding, impact, or the like occurs even in the slightest degree between a seal material and a seal surface of this valve body at the time of opening or closing, microparticles occur from the seal material. The occurrence of these particles contaminates a wafer transfer space where extremely high cleanliness is required. Thus, as a valve of this type, in order to inhibit the occurrence of these particles as much as possible, a so-called non-sliding gate valve has been used in which the occurrence of sliding or the like is prevented when the valve body closes the seal surface.

In recent years, for a valve of this type, with the above-described high cleanliness (low occurrence of particles) taken as a precondition, stable valve-body open/close movements at high speeds have been demanded in order to further improve productivity. Also, for a semiconductor manufacturing apparatus including the valve of this type, a compact design with the apparatus appropriately integrated as much as possible has been increasingly demanded.

As non-sliding vacuum gate valves configured in a compact form of this type, examples are suggested in Japan Patent No. 5533839, Japan Patent No. 5545152, and Japanese Unexamined Patent Application Publication No. 2018-71642. These examples each disclose a gate valve which is activated by a cam mechanism. The gate valve adopts the following structure. That is, a state is kept in which a member which is displaced together with one stem and and one valve body is elastically pushed by a spring member arranged as appropriate in the valve at the center position in the valve toward one direction. Also, on each of both left and right sides of this elastically-pushed member, a driving mechanism for driving this member is integrated in a compact form.

In Japan Patent No. 5533839, at a full-open position (the lowermost part), a lever member is elastically pushed upward by a compression spring disposed directly below, and cam rollers provided on the left and right sides of the lever member are each locked at an upper end of a cam groove formed in a cam frame. When the valve is closed, a rod arm ascends integrally with an ascent of a piston of an air cylinder. For this ascending movement, translation is ensured by a guide roller provided to a cylinder housing positionally fixed to a body (valve main body) side being engaged with a guide groove. Here, cam rollers provided at two upper and lower points of the lever member fit in cam grooves provided at two upper and lower points at corresponding positions of the cam frame, thereby supporting a constant orientation of the lever member at the two upper and lower points. Also with this translation, a stop roller formed to protrude from the upper cam roller fits in a recessed groove formed in a lower part inside a roller frame.

Then, the stop roller makes contact with a contact part at an upper end of the recessed groove. From this contact and onward, the ascent (translation) of the lever member (valve plate) becomes in a locked state, and the valve plate is at a full-close position. Also, by the resilience of the compression spring, the lever member is kept at this position. Furthermore, when the rod arm (rod-side assembly) ascends, the cam rollers in which this ascent is locked moves along the continuously-ascending guide groove. While a cam frame (guide groove) side is positionally fixed in a direction perpendicular (horizontal) to an ascending direction, a lever member side can be positionally shifted in this direction. Thus, a shaft-side assembly is configured in a manner such that, together with the cam roller moving along the tilted cam grooves, the valve plate vertically moves by the above-described positional shift toward a valve seal surface to cause a full-close state. Thus, Japan Patent No. 5533839 discloses an example of an L-movement type in which, by taking the cam rollers at two upper and lower points of the lever member as starting points, the lever member, the valve shaft, and the valve plate move as a whole in a parallel crank manner with respect to the cam frame to close the valve.

In Japan Patent No. 5545152, at a full-open position (the uppermost part), a displacement block is elastically pushed downward by a coil spring disposed directly above, and tilting rollers provided at upper ends on the left and right sides of the displacement block are positioned at lower ends of roller grooves of a connecting block. When the valve is closed, a yoke also descends integrally with a descent of a piston of a hydropneumatic cylinder. During this descending movement, paired pin members provided on a side surface of the displacement block are retained in engagement groove partis of an engagement bracket firmly fixed to a lower part of an engagement member, thereby keeping a constant movement orientation of a valve disk. Also with this descending movement, paired support rollers rotatably provided at lower ends on the left and right sides of the displacement block are inserted in recessed partis formed in an upper surface of a base part to be open upward. Here, a damper provided in each recessed part mitigates an impact when the support roller fits in the recessed part to be locked.

Then, from locking of the descent of the movable support rollers onward, the descent of the displacement block is also locked at this position. While the displacement block is maintained at this position by the elastic push from the coil spring, a connecting block (yoke) continues descending. Thus, the tilting rollers move along the continuously-descending roller grooves. Here, the connecting block (roller groove) side is positionally fixed in a descending direction, but the displacement block (valve disk) side can tilt. Thus, it is configured such that, together with the tilting rollers moving along the tilted cam grooves, the valve disk side tilts to move toward a seal surface to cause a valve-close state. When the valve disk closes the seal surface, a valve closing load is mitigated by the operation effect of a retaining mechanism formed of two pairs of retaining rollers inserted in roller insertion grooves in an inner wall part of a side frame and a pressure-receiving member. Thus, Japan Patent No. 5545152 discloses an example of a J-movement type which moves in a pendular manner, by taking first rollers (tilting rollers) of the displacement block as fulcrums, to close the valve.

On the other hand, the applicant suggests Japanese Unexamined Patent Application Publication No. 2018-71642. In this gazette, at a full-open position (the lowermost part), a valve-body open/close driving body is elastically pushed by a spring from a lower surface side by a spring receiving part provided on an upper part on each of the left and right sides, and an upper surface side of the spring receiving part is locked to a lower surface side of a cam member. In this state, the valve-body open/close driving body ascends together with an ascent of a cylinder mechanism. Here, with at least an upper surface of the spring receiving part and a lower surface of the cam member having a surface contact (elastic push), the orientation of the valve-body open/close driving body is kept constant.

Then, a fulcrum portion provided to a lower part of the valve-body open/close driving body is locked to a stopper part provided to a lower part of a housing body. From this locking onward, by the resilient for of the spring, the valve-body open/close driving body is retained at this position. Also, a cam groove of the cam member continues ascending. Thus, cam rollers provided to upper partis on the left and right sides of the valve-body open/close driving body fitting in this cam groove move along this cam groove (cam member). It is configured such that, with this movement, the valve-body open/close driving body makes pendular (L-motion) movements, by taking the paired upper cam rollers as points of effort, taking paired fulcrum portions provided to a lower part as fulcrums, and taking a valve body positioned at an upper end as a point of load, thereby causing a valve-body seal material to make a close contact with and pressurize a valve-seat seal surface approximately in parallel to allow a full-close state.

BRIEF SUMMARY OF THE INVENTION

However, Japan Patent No. 5533839 has the following problem. Firstly, the compression spring is arranged so as to elastically push the lever member by taking the rod arm vertically driven integrally with the air cylinder as a starting point. Thus, with the movement of the rod arm, superfluous compression/expansion acts on the compression spring due to its own inertia and the inertia of the lever member to disturb a resilient force pushing the lever member, and the movement of the valve plate thus also tends to be destabilized. In particular, destabilization is conspicuous when the valve is driven at high speeds.

Moreover, when the valve plate is caused to translate, two pairs of (four in total) guide rollers slide in the guide grooves of the cam frame. When the valve plate is vertically moved toward the valve seat surface, two pairs (four in total) cam rollers slide in the cam grooves, and also one pair of (two) stop rollers also slide in the recessed grooves of the roller frame. Thus, to cause the valve plate to make L-type movements, sliding of at least six rollers in total is required, and thus the valve has a large friction sliding amount as a whole when driven. Thus, a large driving force is required for a load particularly at the time of valve closing, and a decrease in life, and a breakdown and operation failure of the valve, or the occurrence of particles may happen due to a large amount of wear between members.

Furthermore, the lever member moves with the cam rollers at two upper and lower points pressurized into the cam grooves, and thus vertically moves toward the valve seat surface as a substantially parallel state is maintained. In this manner, the lever member does not have rotation flexibility. Thus, when the valve plate is pressed onto the valve seat surface with the same sealing force, the amount of bending of the shaft increases, compared with a lever member with rotation flexibility. This also increases a kink and rubbing between the valve body and the seat surface, and this structure is disadvantageous for reduction in the occurrence of particles.

Moreover, since the rod-side assembly integrally moves, an air supply flow path to the air cylinder can be provided only at a position on a side surface of the valve main body. This inhibits compactability of the valve and also narrows options in valve design. Furthermore, there is no consideration given to mitigation of impacts when the stop rollers make contact with contact partis and the valve seat surface is closed.

As with Japan Patent No. 5533839, in Japan Patent No. 5545152, firstly, the coil spring is arranged so as to elastically push the displacement block by taking the movable yoke as a starting point, and the structure thus tends to destabilize the movement of the valve disk. Also, as with many other gate valves with a cam mechanism, in Japan Patent No. 5545152, tilting is performed by taking the lowermost part (tilting roller) on the displacement block side as a fulcrum. Therefore, since the distance between the point of load and the fulcrum is long, the valve body is tilted more than a tilt angle required for the movement of pushing the valve body onto the valve-seat seal surface, and thus the tilt angle and the amount of bending of a valve rod occurring when the valve disk is closed are increased, thereby increasing kinks and the amount of rubbing to impair the low occurrence of particles.

Furthermore, while impacts at the time of valve driving and valve closing are mitigated by at least the damper, the retaining mechanism, and the pressure-receiving member, these structures themselves are complex, and thus a simple, compact valve structure is lost. Still further, as with Japan Patent No. 5533839, the structure is such that an air supply flow path to the hydropneumatic cylinder can be provided only at a position on a side surface of the valve main body.

By contrast, in Japanese Unexamined Patent Application Publication No. 2018-71642, valve driving from full open to full close is performed via one upper pair and one lower pair of (four in total) rollers. Therefore, the entire amount of friction is minimum, as in Japan Patent No. 5533839. Also, since the valve-body open/close driving body has rotation flexibility, the amount of bending of the stem is small. Furthermore, since the cylinder mechanism is accommodated inside the housing body on a fixed side, an air supply flow path can be provided also to a lower part of the valve main body. Still further, since the pendular movements of the valve body take the lower part of the valve-body open/close driving body as a fulcrum, the tilt angle is not more than required. Thus, at least in view of the above-described points, Japanese Unexamined Patent Application Publication No. 2018-71642 solves the above-described problems in Japan Patent Nos. 5533839 and 5545152.

However, in Japanese Unexamined Patent Application Publication No. 2018-71642, two springs on the left and the right which elastically push the valve-body open/close driving body upward are inserted between the lower surface side of the spring receiving part and a shoulder part of a piston rod. Thus, when the valve body is closed (cam activation stroke), these springs have to be further compressed by the piston rod. Thus, in the cam activation stroke, the driving force required for closing the valve body and also for the piston rod is increased. At the full-close position where the valve body is closed, a large resilient force by two springs presses the piston rod downward (opening direction). To reliably retain the piston rod as a full-close state against this resilient force, a lock mechanism (latch lock) for locking a downward movement is required, thereby posing a problem of making the structure and movements of the valve complex accordingly.

Moreover, since the resilient force of the springs occur in the cam activation stroke as described above, this cam activation stroke is required to be minimum, thereby also posing a problem in which the length of the cam groove of the cam member, which determines this stroke, cannot be formed to be long as required. Thus, for example, when air supply to the piston rod is adjusted to increase the driving (ascending/descending) speed of the valve, if the cam groove is kept short, a span of the cam activation stroke is not sufficient to increase the L-motion movement speed of swinging the valve body more than required, thereby also posing a problem of increasing vibrations and impacts when the valve body is closed.

Thus, the present invention was developed to solve the above-described problems, and has an object of providing a vacuum gate valve configured in a compact form capable of reducing a kink and sliding between a valve-body seal material and a seal surface with a minimum driving force, achieving a low occurrence of particles, stably and reliably performing valve-body open-close movements even under high-speed driving, restricting impulsive sound such as metallic sound and vibrations as much as possible, and also having high durability.

To achieve the object described above, a first aspect of the present invention is directed to a vacuum gate valve including housing bodies arranged so as to be opposed to each other, a valve-body open/close driving body arranged between the housing bodies to perform vertical movements and L-motion movements, and a stem provided with a valve body at an upper part of the valve-body open/close driving body, wherein each of the housing bodies has therein a piston rod which makes vertical movements by a cylinder mechanism and a cam member with a cam groove provided at an upper end of the piston rod, on each side of the valve-body open/close driving body, a cam roller and a fulcrum roller are provided, the cam roller being slidably guided along the cam groove, on an inner side of the housing body, a vertical movement guiding part which guides vertical movements of the fulcrum roller and a stopper part which locks an ascent of the valve-body open/close driving body are provided, and a spring for causing the valve-body open/close driving body to ascend to an upper end part of an opening stroke is provided between a lower part of the valve-body open/close driving body and a fixed base part on a fixed side.

A second aspect of the present invention is directed to the vacuum gate valve in which a piston cushioning mechanism for deceleration formed of a cushion gasket and an orifice is provided on a valve-close side and a valve-open side inside the cylinder mechanism.

A third aspect of the present invention is directed to the vacuum gate valve in which an elastic bushing for cushioning is attached to a narrow-width part on a valve-close side of the cam groove of the cylinder mechanism, and an elastic bushing for roller reception is attached to the stopper part which guides vertical movements of the fulcrum roller and locks an ascent of the fulcrum roller.

A fourth aspect of the present invention is directed to the vacuum gate valve in which the spring has an upper end attached to a lower recessed surface of the valve-body open/close driving body and has a lower end attached to a cylinder head of the housing body, the cylinder head being taken as the fixed base part.

A fifth aspect of the present invention is directed to the vacuum gate valve in which a movement guide mechanism which guides the vertical movements and the L-motion movements as valve open/close movements is provided on each side of the valve-body open/close driving body and inside each of the housing bodies.

A sixth aspect of the present invention is directed to the vacuum gate valve in which the movement guide mechanism is formed of a fixed-side guiding member provided to each of the housing body and a movable-side guiding member provided to the valve-body open/close driving body.

According to the first aspect of the present invention, an actuator structure as a vacuum gate valve can be made thin and simplified, and also can be configured in a compact form. Also, the valve-close state can be reliably and stably retained. Thus, a gate valve capable of high-speed movements can be provided.

According to the second or third aspect of the present invention, the piston cushioning mechanism is provided on the valve-close side and the valve-open side of the cylinder mechanism. Thus, the speed at full-open and full-close at the time of high-speed activation can be decreased to allow reduction of impulsive sound, vibrations, and so forth at that time. Furthermore, the elastic bushing for cushioning is attached to the stopper part of the cam groove of the cylinder mechanism and an elastic bushing for roller reception is also attached to the stopper part of the fulcrum roller. Thus, impulsive sound such as metallic sound, vibrations, and so forth occurring when the cam roller and the fulcrum roller collide in L-motion movements at the time of an L-motion movement in high-speed activation can be reduced as much as possible.

According to the fourth aspect of the present invention, in a valve-close state, the weight of the valve-body open/close driving body and the load of the spring do not act in a direction of causing the piston to descend. Thus, the valve-close state is locked by a resilient force of valve-body closing, and the valve is prevented from inadvertently opening even with exhaustion of operation air. Also, since the spring increases the speed of the ascent of the valve-body open/close driving body, high-speed activation can be performed from the valve-open side. Furthermore, the actuator itself can be made compact, and a significant contribution can be made to reduction in the occurrence of particles.

According to the fifth or sixth aspect of the present invention, L-motion movements are made by the movement guide mechanism in a more stable state. Thus, the occurrence of particles is reduced, and durability as a gate valve and durability as a guiding member are favorable.

BRIEF DESCRIPTION OF THE DRAWINGS

FIG. 3A is a front view of a valve-body open/close driving body of the first embodiment;

FIG. 3B is a side view of FIG. 3A;

FIG. 7A is a schematic diagram depicting operation of a vertical-movement guiding part and an L-motion movement guiding part which guide movements of the valve-body open/close driving body in the first embodiment viewed from the inner side surface side of the housing body, in which the valve-body open/close driving body is at the full-open position;

FIG. 7B is a schematic diagram depicting the operation of the vertical-movement guiding part and the L-motion movement guiding part, in which the valve-body open/close driving body is at the full-close position;

FIG. 7C is a schematic diagram depicting the operation of the vertical-movement guiding part and the L-motion movement guiding part, in which the valve-body open/close driving body performs an L-motion movement to become in a full-close state;

FIG. 8A is a longitudinal cross-sectional view of a housing body having another example structure of the present invention, in which a piston is at a position corresponding to a nearby position immediately preceding the full-close position of the valve-body open/close driving body;

FIG. 8B is a longitudinal cross-sectional view of the housing body having the other structure example of the present invention, in which the piston is at a position corresponding to a position in the course of an L-motion movement of the valve body;

FIG. 8C is a longitudinal cross-sectional view of the housing body having the other structure example of the present invention, in which the piston is at a position near a top dead center;

DETAILED DESCRIPTION OF THE INVENTION

Figure 1:
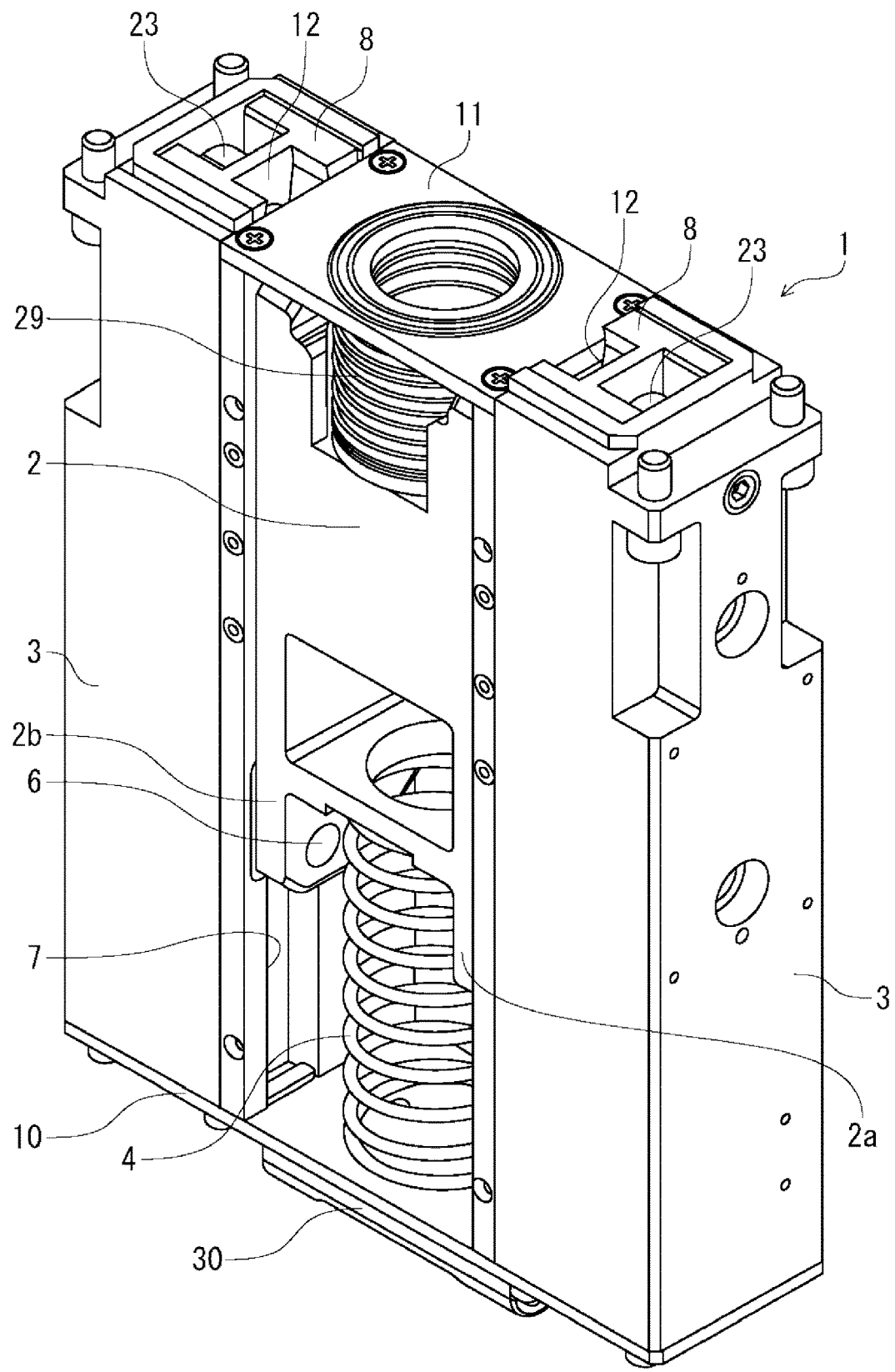
FIG. 1 is a perspective view of an assembled valve main body of a first embodiment.
Figure 2:
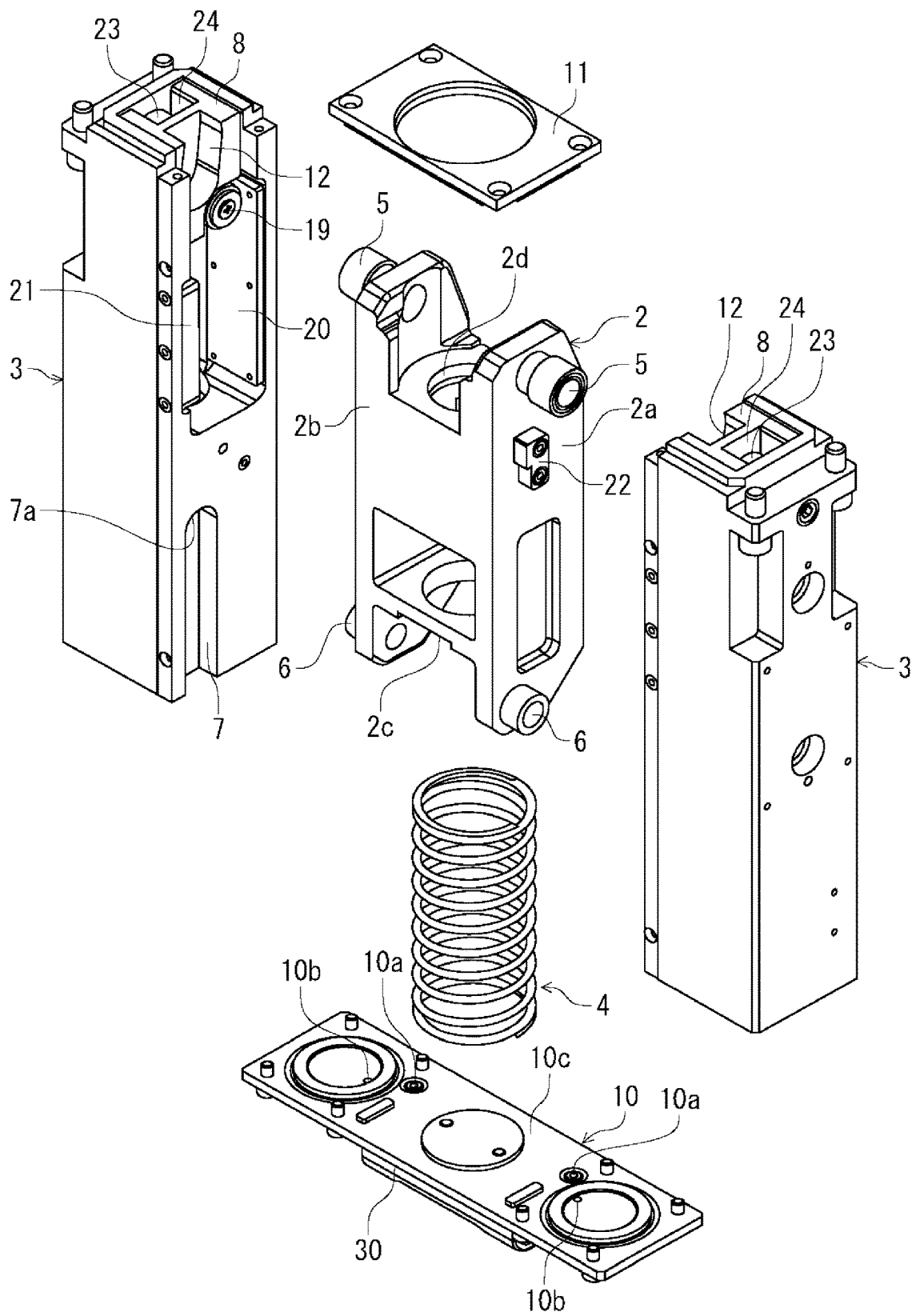
FIG. 2 is an exploded perspective view of FIG. 1.
Figure 4:
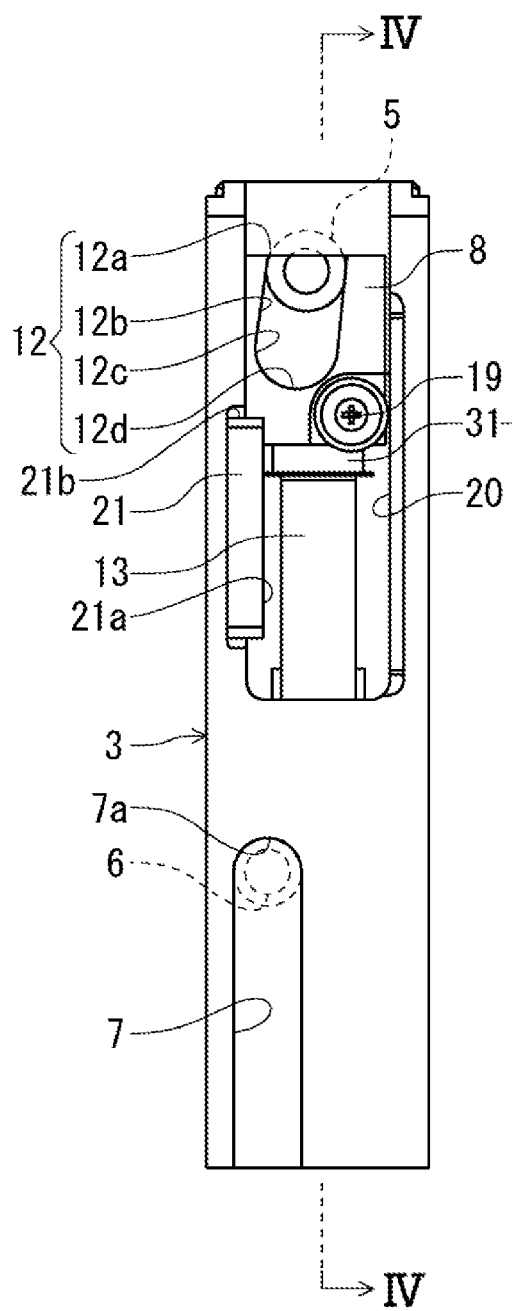
FIG. 4A is a side view of a housing body of the first embodiment viewed from an inner side surface side.
FIG. 4B is a cross-sectional view along a IV-IV line of FIG. 4A.
Figure 4:
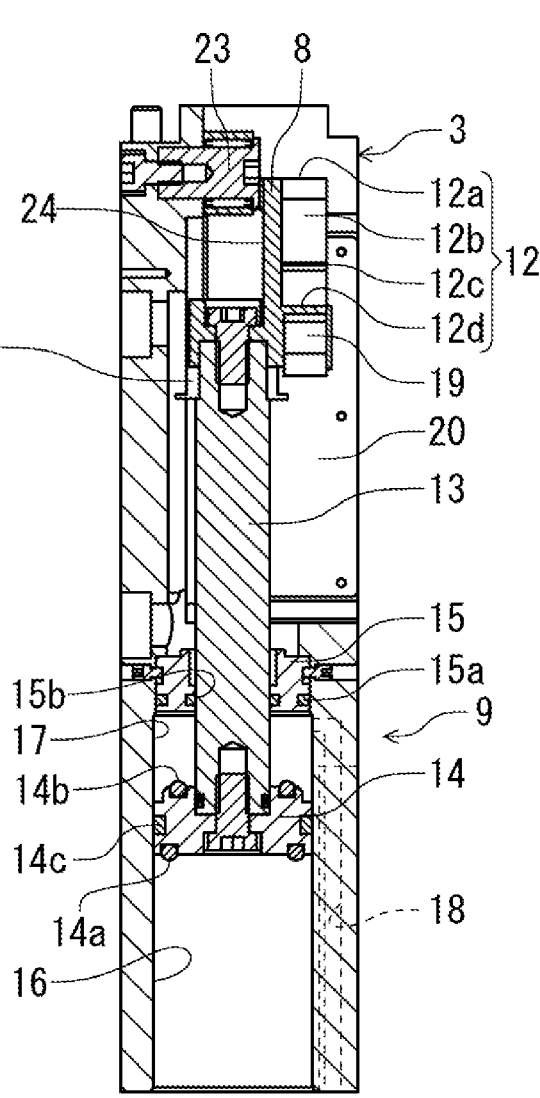

A preferred embodiment (also referred to as a first embodiment) of a vacuum gate valve in the present invention is described in detail based on the drawings. FIG. 1 is an outside perspective view of a vacuum gate valve in the first embodiment formed of paired housing bodies 3 arranged to be opposed to each other and a valve-body open/close driving body 2 arranged therebetween and including a valve body 25, the vacuum gate valve assembled as a valve main body 1. FIG. 2 is an exploded perspective view of FIG. 1. FIG. 3A and FIG. 3B are a front view and a side view, respectively, of the valve-body open/close driving body 2 of the first embodiment partially depicted as a cross section. FIG. 4A is a side view of the housing body 3 of the first embodiment viewed from an inner side surface side. FIG. 4B is a cross-sectional view along a IV-IV line of FIG. 4A.

As depicted in FIG. 1 and FIG. 2, two housing bodies 3 each having a housing formed in a long columnar shape are configured in a bilaterally symmetrical manner, are arranged so as to be opposed to each other as an independent pair, and have a cylinder mechanism 9, which will be described further below, accommodated therein, thereby configuring a driving mechanism of a vacuum gate valve of the first embodiment. In this manner, in the vacuum gate valve of the first embodiment, two housing bodies 3 having a symmetrical structure are used. Therefore, components can be easily used in common. Also, since these two bodies are independent, assembling is simple. Furthermore, driving mechanisms are not present under the valve main body 1 but are integrated on the left and right in a compact manner. Therefore, the valve main body 1 can be optimally integrated.

In FIG. 4A, a vertical movement guiding part 7 having a stopper part 7a is provided to an inner lower part of each housing body 3. The vertical movement guiding part 7 has a function of guiding a vertical movement of the valve-body open/close driving body 2. The stopper part 7a has a function of locking an ascending movement of the valve-body open/close driving body 2. The vertical movement guiding part 7 and the stopper part 7a each having the above-described function can be configured in any manner in accordance with implementation.

The vertical action guiding partis 7 of the first embodiment are two vertical grooves formed on both inner sides of the paired housing bodies 3 and linearly cut out along an axial core direction from lower end faces at symmetrical positions, and each have a groove width slightly larger than the outer diameter of a fulcrum roller 6, which will be described further below, allowing the fulcrum roller 6 to move in the groove in a slightly loose-fit state almost without resistance. The stopper part 7a is formed at an upper end part of the vertical movement guiding part 7 to have a (circular) shape having the same diameter as the outer diameter of the fulcrum roller 6. The fulcrum roller 6 is engaged with the stopper part 7a to lock the ascending movement of the valve-body open/close driving body 2, which will be described further below, thereby allowing its locking state to be appropriately maintained.

In FIG. 4A, a piston rod 13 is accommodated inside the housing body 3, and performs vertical movements by the cylinder mechanism 9. As depicted in FIG. 4B, a piston 14 is firmly fixed to a lower end part of the piston rod 13 with a bolt. To a lower surface and an upper surface of this piston 14, O rings 14a and 14b, respectively, are concentrically provided to support the lower and upper surfaces of the piston 14. Also, a gasket 14c for sliding seal is provided to an outer diameter side of the piston 14.

In FIG. 4B, an upper air chamber 17 and a lower air chamber 16 are allocated in an inner space of the cylinder mechanism 9, and are each formed in a cylindrical shape having an inner diameter substantially equal to the outer diameter of the piston 14. To the upper air chamber 17 of the piston 14, an air flow path 18 formed inside the housing body 3 communicates, allowing compressed air to be supplied and discharged from an air supply source not depicted via a cylinder head 10, which will be described further below. Similarly, also to the lower air chamber 16 of the piston 14, compressed air can be supplied and discharged via the cylinder head 10. To an upper end of the upper air chamber 17, a piston bearing 15 is firmly fixed via a seal material 15a. The piston rod 13 is inserted into this piston bearing 15 via a seal material 15b.

In FIG. 4A and FIG. 4B, a cam member 8 is firmly fixed with a bolt to an upper end part of the piston rod 13. In the cam member 8, a long-hole-shaped cam groove 12 is formed. Any material, shape, and size of the cam member 8 and any shape (such as length and tilt) of the cam groove 12 can be selected in accordance with implementation. The cam member 8 of the first embodiment is formed in a block shape and is firmly fixed in parallel with the axial center direction of the piston rod 13. The cam groove 12 of the first embodiment is formed to have an upper end part provided with a narrow-width part 12a that can appropriately lock the movement of the cam roller 5 and has a width smaller than the outer diameter of a cam roller 5, thereby preventing the cam roller 5 fitting in the cam groove 12 from moving and coming away from the cam groove 12 to allow reliable locking. Also, the cam groove 12 has formed therein a tilted part 12b toward a tilting direction and a flat part 12c toward a parallel direction with respect to the axial center direction of the cam member 8 (piston rod 13). This flat part 12c is a lower end part of the cam groove 12. This lower end part forms an arc part 12d formed to have a (circular) shape having the same diameter as the outer diameter of the cam roller 5. Note that an upper end side where the narrow-width part 12a is present is a valve-close side of the cam groove 12 and the reverse side is a valve-open side of the cam groove 12.

In FIG. 4A and FIG. 4B, below the cam member 8 is a cam receiving roller 19 (needle bearing). In the assembled valve main body 1, this cam receiving roller 19 is arranged so as to be opposed to a plate-shaped bearing guide 20 provided toward an inner surface side of the housing body 3. With this bearing guide 20 and the cam receiving roller 19 closely opposed, vertical movements of the cam member 8 are supported. Although not depicted, as with this cam receiving roller 19, another roller member (ball bearing) may be provided at a position opposed to the bearing guide 20 and capable of receiving.

A cam receiving roller 23 (needle bearing) is provided also to an upper end part of the housing body 3. This cam receiving roller 23 is arranged so as to be able to be accommodated in a roller receiving part 24 provided in a recessed form on an opposite side of the cam groove 12 of the cam member 8 when the cam member 8 ascends near an uppermost part. Furthermore, a sensor dog 32 is provided between the cam member 8 and the piston rod 13. In combination with magnetic proximity sensors 32 arranged at two upper and lower locations depicted in FIG. 5 (left side), this sensor dog 32 can detect an open/close position of the piston rod 13.

In FIG. 2, FIG. 3A, and FIG. 3B, the valve-body open/close driving body 2 is arranged at the center position of the valve main body 1 so as to be able to perform vertical movements and L-motion movements, as will be described further below, between the left and right housing bodies 3, and is provided, at upper portions on both sides, with the paired cam rollers 5 in a bilaterally symmetrical manner and is also provided, at lower portions on both sides, with the paired fulcrum rollers 6 in a bilaterally symmetrical manner. Also, while any elastic member that can keep the valve-body open/close driving body 2 elastically pushed in a certain direction can be selected in the present invention, a coil spring 4 is used in the first embodiment. This coil spring 4 is interposed between a lower side of the valve-body open/close driving body 2 and an upper surface side of the cylinder head 10, and elastically pushes and presses both sides in the assembled valve main body 1.

Normally, used as this spring 4 is one that can make the valve-body open/close driving body 2 to ascend to an upper end part of an opening stroke $L_1$, which will be described further below.

The valve-body open/close driving body 2 is a lightweight frame body with high stiffness configured of an axial support part 2d at the axial core position and two parallel side plate partis 2a and 2b. On a lower surface side, a lower recessed surface 2c (spring receiving part) which receives an upper end of the spring 4 is provided. On side surfaces, paired movable-side guiding members 22, which will be described further below, are provided in a bilaterally symmetrical manner.

The paired cam rollers 5 are provided at approximately upper end positions of the side plate partis 2a and 2b so as to protrude in a bilaterally symmetrical manner. The paired fulcrum rollers 6 are also provided at approximately lower end positions of the side plate partis 2a and 2b so as to protrude in a bilaterally symmetrical manner. In the assembled valve main body 1 (in use), each cam roller 5 fits in the cam groove 12 of the cam member 8, and each fulcrum roller 6 fits in the groove of the vertical movement guiding part 7 of the housing body 3. For these rollers configured as roller members movable in the respective grooves so as not to cause any trouble in the movement of the valve main body 1, any outer diameter, length, roller inner structure, and so forth can be selected in accordance with implementation.

In FIG. 2, FIG. 3A, and FIG. 3B, a stem 28 is fixed to an upper part of the valve-body open/close driving body 2. An upper end of this stem 28 is provided with a rectangular valve body 25 having a valve-body seal material 26. A lower end part of the stem 28 is engaged with the circular axial support part 2d as depicted in FIG. 3A, and is extremely firmly fixed with a bolt and a guide to the extent that rattles do not easily occur also with respect to loadings acting when the valve body 25 closes a seal surface 31 to become in a full-close state. An upper end part of the stem 28 is provided with the valve body 25 via a holder 27. On one surface side of this valve body 25, the valve-body seal material 26 made of a predetermined material for vacuum gate valves is provided in a (rectangular) shape that fits to the opening shape of the seal surface 31. This valve-body seal material 26 can closely contact with and go away from the seal surface 31 depicted in FIG. 5 and FIG. 6A to FIG. 6C as a valve seat.

Figure 5:
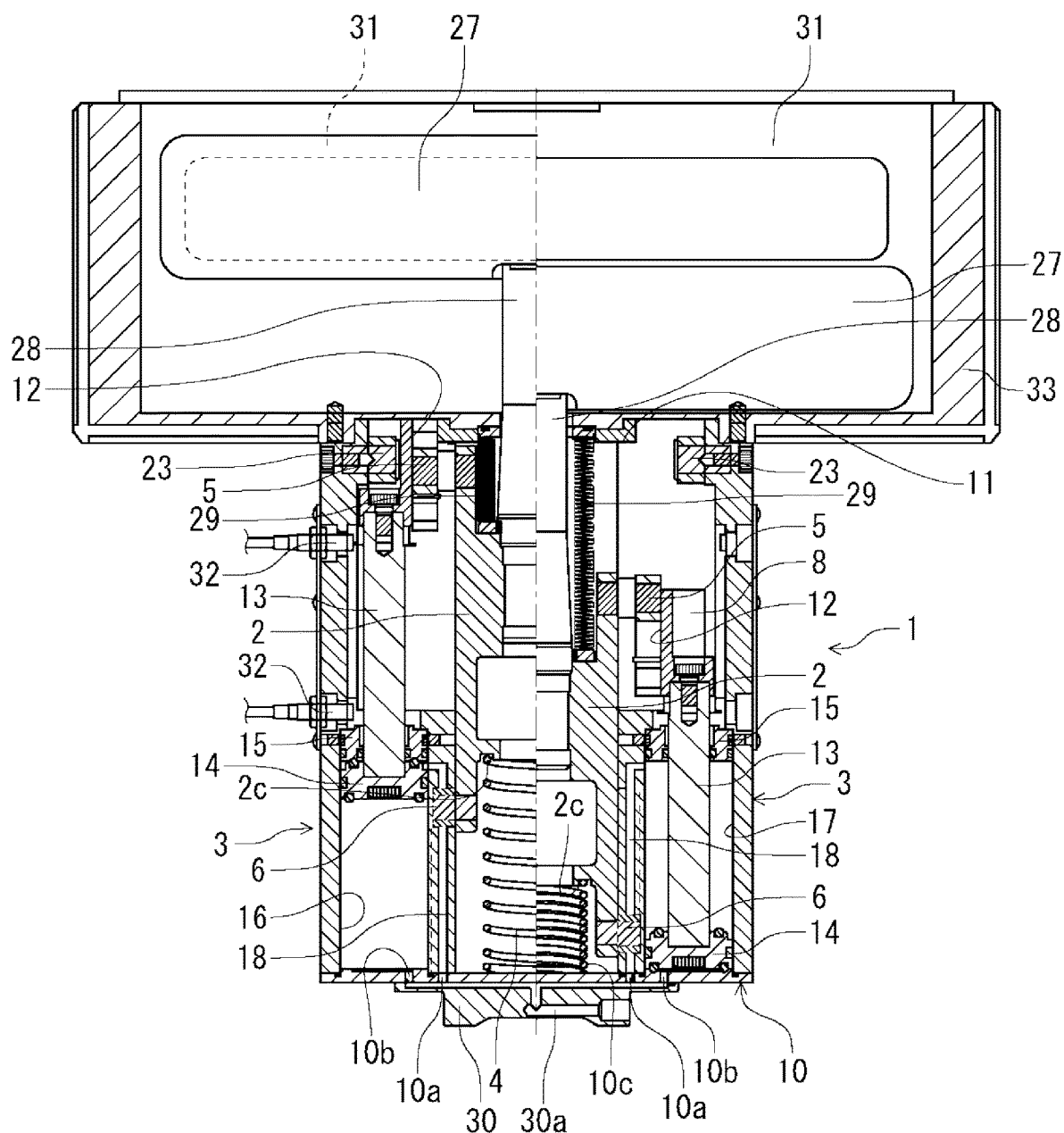
FIG. 5 is a longitudinal cross-sectional view of the gate valve main body of the first embodiment when a movement of opening and closing a seal surface of the body is viewed from front, in which a right side indicates a full-open position of the valve body and a left side indicates a full-close state of the valve body.

When used as a gate valve, an outer circumferential side of the stem 28 communicates to the inside of a wafer transfer space, and thus a predetermined bellows seal structure is provided. In the first embodiment, as depicted in FIG. 3A to FIG. 3B and FIG. 5, bellows formed of bellows 29 including upper and lower bellows flanges 29a and 29b are used. The upper bellows flange 29a is firmly fixed to a body 33 via a gasket, and the lower bellows flange 29b is also firmly fixed to the outer circumference of the stem 28 via a gasket, thereby making a partition between the outer circumferential side of the stem 28 and the valve main body 1 side. Although not depicted, when the gate valve of the first embodiment is used as a door valve, this can be easily configured as a valve without the above-described bellows seal structure.

Figure 14:
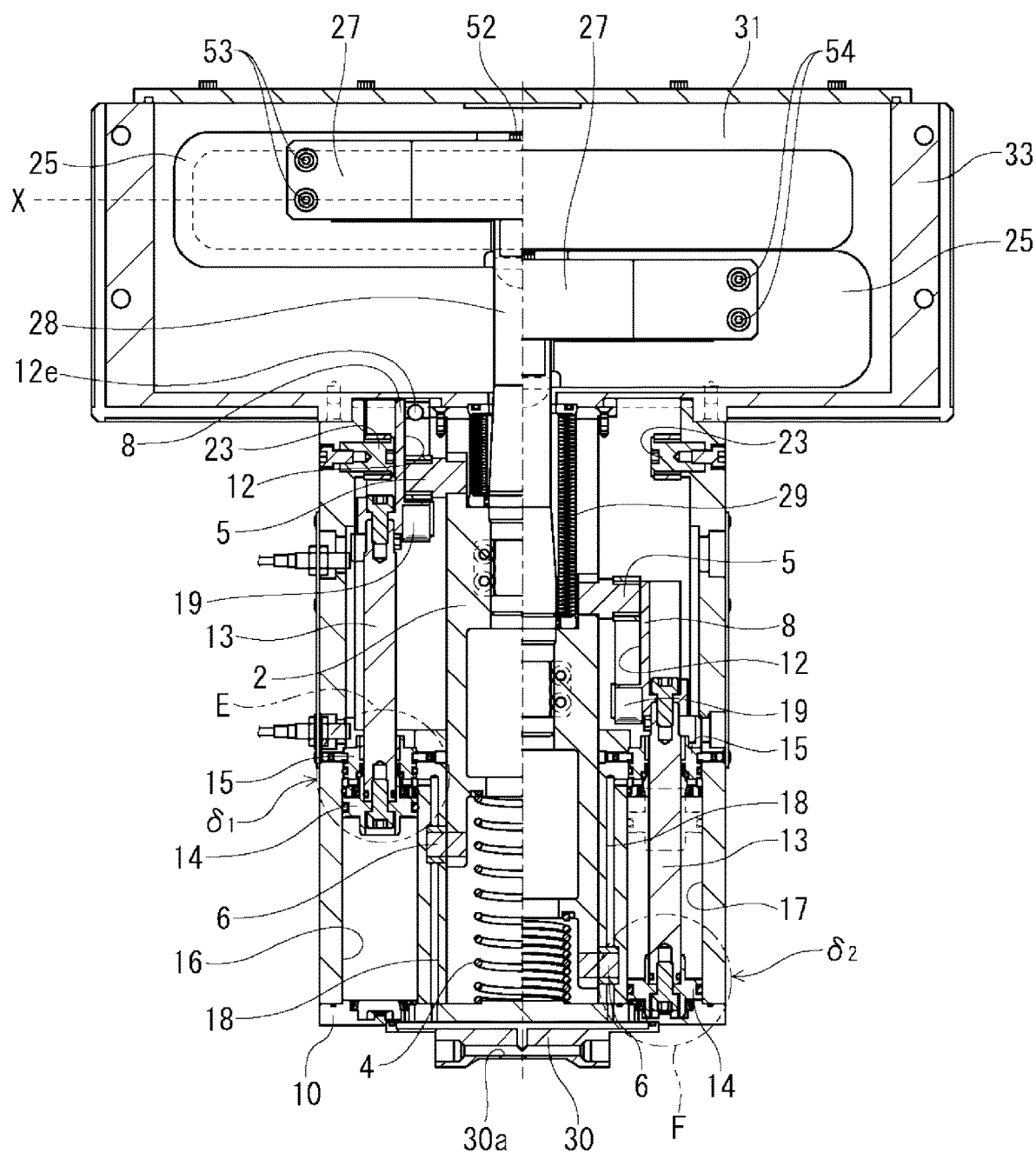
FIG. 14 is a longitudinal cross-sectional view of the gate valve main body of the second embodiment when a movement of opening and closing a seal surface of the body is viewed from front, in which a right side indicates a full-open position of the valve body and a left side indicates a full-close state of the valve body.

In FIG. 1, FIG. 2, and FIG. 5, the cylinder head 10 is provided on a bottom surface side of the valve main body 1 as a fixed base part on a fixed side, which will be described further below, thereby serving as a base body of the valve main body 1. Any structure of the cylinder head 10 can be selected in accordance with implementation. In the first embodiment, the cylinder head 10 is integrally formed as a one thin plate, is firmly fixed commonly to the lower end partis of the paired housing bodies 3 via a seal material in the assembled valve main body 1, and can supply driving air to the cylinder mechanism 9. As depicted in FIG. 2 and FIG. 5, in the first embodiment, a block body 30 having an air flow path 30a is firmly fixed to a lower surface side of the cylinder head 10 via a seal material. This air flow path 30a can supply and discharge driving air as appropriate as communicating to the air supply source not depicted. In FIG. 5, FIG. 14, and so forth, an upper side to which the valve body 25 ascends is a valve-close side of the cylinder mechanism 9 and a lower side to which the valve body 25 descends is a valve-open side of the cylinder mechanism 9.

The air flow path 30a communicates to the flow paths 18 in the housing bodies 3 via two inner hole partis 10a in the cylinder head 10 to communicate to paired upper air chambers 17 of the cylinder mechanisms 9 and also communicates to paired lower air chambers 16 of the cylinder mechanisms 9 via two outer hole partis 10b in the cylinder head 10. Furthermore, at the center position on an upper surface side of the cylinder head 10, a spring receiving part 10c which receives a lower end of the coil spring 4 is provided. In FIG. 1, FIG. 2, and FIG. 5, a holding flange 11 in a rectangular-plate-shape has the upper bellows flange 29a inserted in a circular hole part at the center position, and has four corner partis firmly fixed to inner upper end partis of the housing bodies 3 with bolts.

As depicted in FIG. 1, the assembled valve main body 1 of the first embodiment is configured thinly in a compact manner without a superfluous capacity so that the valve function is optimally integrated. In particular, the air supply source can be integrated in a compact manner below the valve main body 1. Thus, another device can be integrated in parallel with the valve main body 1, which is suitable for a semiconductor manufacturing apparatus desired to be downsized as much as possible.

In FIG. 2, FIG. 3A to FIG. 3B, and FIG. 7A to FIG. 7C, a movement guide mechanism is provided for guiding vertical movements and L-motion movements of the valve-body open/close driving body 2, which will be described further below. Specifically, a vertical movement guiding part α and an L-motion movement guiding part β are provided which can retain the valve-body open/close driving body 2 each in a substantially constant direction. With this function, any structure can be adopted to the valve main body 1 in accordance with implementation. In the first embodiment, as depicted in FIG. 7A to FIG. 7C, the vertical movement guiding part α and the L-motion movement guiding part β are configured of a linear fixed-side guiding member 21 provided inside the housing body 3 and an L-shaped movable-side guiding member 22 protruding to both sides of the valve-body open/close driving body 2.

Specifically, in FIG. 7A to FIG. 7C, the fixed-side guiding member 21 is arranged so as to be opposed to the opposite side of the bearing guide 20 in the housing body 3 as a rail-shaped member having a linearly-formed side surface part 21a and an upper end part 21b formed in a direction crossing this side surface part 21a. The movable-side guiding member 22 is a substantially-L-shaped block-shaped member fixed at positions symmetrical to the two side plate partis 2a and 2b as a pair, and has a linear side part 22a and a step part 22b formed in a direction crossing this side part 22a.

The vertical movement guiding part α of the first embodiment is formed of the side surface part 21a of the fixed-side guiding member 21 and the side part 22a of the movable-side guiding member 22. When the valve-body open/close driving body 2 makes vertical movements as will be described further below, these side surface part 21a and side part 22a become opposed to each other via a slight gap or make contact or slide with each other, thereby allowing stable vertical movements while the orientation of the valve-body open/close driving body 2 is retained at a substantially predetermined angle.

The L-motion movement guiding part β of the first embodiment is formed of the upper end part 21b of the fixed-side guiding member 21 and the step part 22b of the movable-side guiding member 22. When the valve-body open/close driving body 2 makes L-motion movements as will be described further below, these upper end part 21b and step part 22b become opposed to each other via a slight gap or make contact or slide with each other, thereby allowing stable L-motion movements while the valve body 25 included in the valve-body open/close driving body 2 is retained in a direction substantially perpendicular to the seal surface 31. As will be described further below, in a normal case in which the valve-body open/close driving body 2 is always elastically pushed upward, a slight gap is formed between the side surface part 21a and the side part 22a and between the upper end part 21b and the step part 22b so as to prevent both from making contact with each other, that is, so that normal valve movements can be made even without these functions in the normal case.

Next, in the gate valve of the first embodiment, description is made to operation of the valve body 25 ascending from the full-open position to the full-close position (vertical movement) and making an L-motion movement to cause the valve to become in a full-close position. Firstly, a movement of the valve body 25 from the full-open position to the full-close state corresponds to the right side to the left side of FIG. 5, FIG. 6A to FIG. 6B, and FIG. 7A to FIG. 7B. Here, in accordance with the vertical direction of these drawings, the full-open position (full-open state) of the valve body 25 is a position (state) where the valve body 25 is located lowermost in the valve main body 1 and the full-close position is a position where the valve body 25 is located uppermost therein. A range between these full-open position and full-close position of the valve body 25 corresponds to the piston stroke $L_1$ (opening stroke) of the cylinder mechanism 9 depicted in FIG. 6C.

Figure 6:
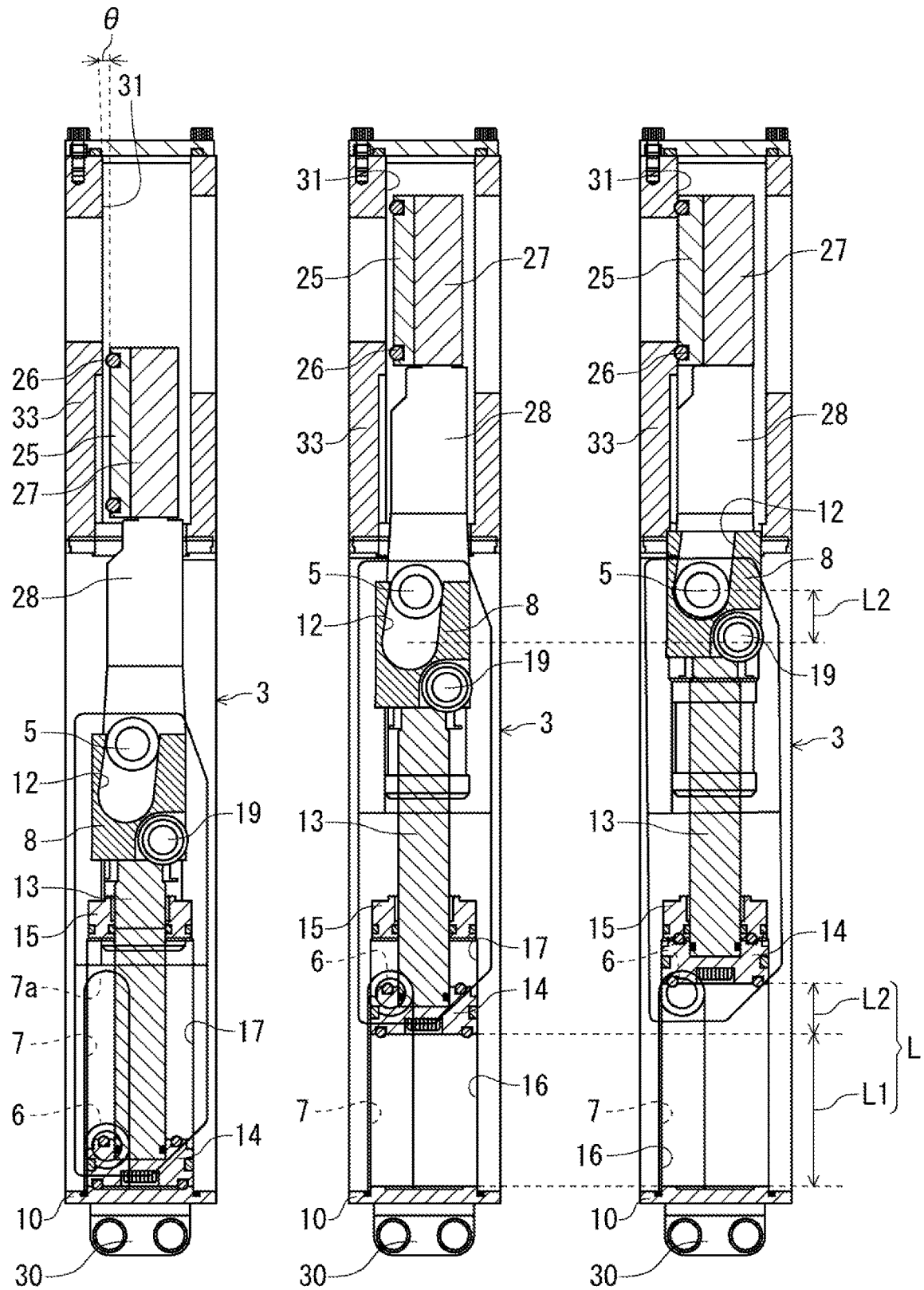
FIG. 6A is a longitudinal cross-sectional view of the valve body at the full-open position.
FIG. 6B is a longitudinal cross-sectional view of the valve body changed from the state of FIG. 6A to ascend to a full-close position.
FIG. 6C is a longitudinal cross-sectional view of the valve body changed from the state of FIG. 6B to perform an L-motion movement to close the seal surface to become in a full-close state.

Firstly, to cause the valve to become in a full-open state, compressed air is supplied to the upper air chamber 17 via the flow path 18 of each housing body 3 to press the piston 14 down for a descent to a lower end position of the cylinder where the capacity of the lower air chamber 16 is eliminated as depicted in FIG. 5 and FIG. 6A. This compressive descent also causes the valve-body open/close driving body 2 elastically pushed by the spring 4 upward from below to descend to the full-open position.

Here, the valve-body open/close driving body 2 of the present invention in a resilient state toward one direction by the elastic member, with the fixed base part on the fixed side as a starting point. The fixed base part on the fixed side is a member which does not move (is not driven) with respect to the valve of the present invention in a stationary state to the outside, including, for example, the housing body 3, the holding flange 11 above, the cylinder head 10 below, a housing of the valve main body 1 not depicted, and so forth but not including, in the first embodiment, at least the cam member 8 and the piston rod 13 integrally moving with the vertical movements of the cylinder mechanism 9 in use. In the first embodiment, as described above, with the cylinder head 10 (spring receiving part 10c) as a fixed base part and this spring receiving part 10c as a starting point, the upper end part of the spring 4 elastically pushes the lower recessed surface 2c of the valve-body open/close driving body 2 in an upper direction.

The elastic member which elastically pushes the valve-body open/close driving body 2 is arranged in a resilient state irrespective of the piston rod 13 which makes vertical movements with at least opening/closing of the valve. Not by elastically pushing from a movable member but by taking the fixed member side as a starting point serving as one end of elastic pushing, the movement of the valve-body open/close driving body 2 as the other end to be pressed and followability of the resilient force with respect to this movement become optimized. Thus, if the cylinder mechanism is operated at high speeds, stability of the valve-body open/close driving body 2, that is, the valve body movement, can be ensured. In particular, unlike the conventional technique (Japanese Unexamined Patent Application Publication No. 2018-71642), the spring as an elastic member is not arranged between a lower surface side of the spring receiving part (valve-body open/close driving body 2) and a shoulder part of the piston rod. Thus, it is not required for the piston rod to compress the spring even in a stroke range of causing the valve body to make L-motion movements, and a lock mechanism of the cylinder is thus not necessary while the valve body is closed. Thus, the valve structure can be simplified. Also, the cam groove of the cam member can be formed to be long as appropriate. Thus, the L-motion movement speed of the valve body can be mitigated as appropriate.

In this manner, by making the valve-body open/close driving body including the valve body in a resilient state with the fixed base part as a starting point, compared with the conventional technology in which a resilient state is made with the driving member as a starting point, unwanted compression/expansion force does not act on the elastic member (spring) by inertia with driving, and a stable resilient force with favorable followability can be always given, with one end as a fixed side. Thus, the movements of the valve body (such as vertical movements and L-motion movements) are not excessively disturbed by the driving force of the valve body, leading to stabilization of the movements of the valve body and saving of driving forces. Also, the compression/expansion amount of the elastic member is reduced to minimum as necessary, and durability of the valve is increased, thereby contributing to an improvement in life. Also, the elastic member is provided inside the valve main body in a compact manner to allow a resilient state of the valve-body open/close driving body 2 to be achieved in a simple manner. Furthermore, adjustment and maintenance of this resilient state can be facilitated, such as easy component replacement and maintenance.

At the full-open position of this valve body 25, as depicted in FIG. 6A, the valve body 25, the stem 28, and the valve-body open/close driving body 2 are retained to have a tilted orientation slightly tilted (tilted angle θ=on the order of 0.2 to 0.3) with respect to a vertical direction in FIG. 6A (that is, a direction parallel to the seal surface 31). Specifically, at this position, the valve-body open/close driving body 2 is in a resilient state upward from below, and an ascending force by this repulsion substantially directly forms a force of the cam roller 5 fitting in the cam groove 12 of the cam member 8 firmly fixed to the piston rod 13 positioned lowermost to engage with the narrow-width part 12a of the upper end part of the cam groove 12. This narrow-width part 12a receives the ascending force of the valve-body open/close driving body 2.

On the other hand, with the engagement of this cam roller 5 with the narrow-width part 12a, the valve-body open/close driving body 2 is supported at one upper point, and is thus rotatable about this upper part. However, this rotation is locked because the fulcrum roller 6 below fits in the groove of the vertical movement guiding part 7 of the housing body 3. As described above, since the groove width of the vertical movement guiding part 7 and the outer diameter of the fulcrum roller 6 approximately match each other, the above-described stable tilted orientation of the valve-body open/close driving body 2 is retained at this full-open position as being supported at two upper and lower points (the cam roller 5 and the fulcrum roller 6) almost without rattles. Although not depicted, since the spring 4 is in the most compressed state at this full-open position, the cylinder mechanism 9 may be provided with a lock mechanism as appropriate to allow the position of the piston 14 to be stably retained in this state.

Next, from the full-open position, by adjusting a differential pressure between the upper and lower air chambers 16 and 17 (more specifically, by reducing the pressure of the compressed air in the upper air chamber 17 as appropriate by air discharge), the resilient force of the spring 4 is released, thereby allowing the valve-body open/close driving body 2 to ascend. This air pressure adjustment can be performed as required in accordance with implementation. With this adjustment, the ascending speed of the valve-body open/close driving body 2 can be set as appropriate.

Normally, as described above, it is set that the resilient force of the spring 4 is always uninterrupted between the full-open position and the full-close position of the valve body 25 and the state of the valve-body open/close driving body 2 elastically pushed upward is kept. Thus, in the $L_1$ stroke range under this action of this resilient force, engagement of the cam roller 5 with the narrow-width part 12a and the engagement (rotation) of the fulcrum roller 6 into the groove width of the vertical movement guiding part 7 are always maintained. Thus, the tilted orientation of the valve-body open/close driving body 2, the stem 28, and the valve body 25 is always stably maintained. As for the vertical movement guiding part α, if the tilted orientation of the valve-body open/close driving body 2 is always stable, as described above, the side surface part 21a and the side part 22a do not make contact or slide with each other as long as this orientation is maintained.

In the $L_1$ stroke range, the upward resilient force of the spring 4 may be interrupted. For example, the ascending speed of the cam roller 5 (valve-body open/close driving body 2) may be delayed behind the ascending speed of the cam member 8 (piston rod 13) due to influences such as the moving speed, the weight (inertia) of the valve-body open/close driving body 2 (valve body 25), sliding of the gasket 14c of the piston 14, sliding of the fulcrum roller 6, and so forth. With this delay, the cam roller 5 may come off, although instantaneously, from the engagement of the narrow-width part 12a to descend in the cam groove 12 at a position in the course of ascending (cam activation). However, if this coming-away is merely instantaneous, the engagement state of the cam roller 5 is recovered immediately by the resilient force of the spring 4, and thus the normal operation of the valve movement is not impaired.

Conversely, the operation in which the valve body 25 ascending as described above to become at the full-close position again descends to become at the full-open position is basically in reverse to the operation described above. Thus, with the fulcrum roller 6 guided by the vertical movement guiding part 7, the valve-body open/close driving body 2 in the resilient state by the elastic member (spring 4) can make vertical movements integrally with the vertical movements of the piston rod 13. These vertical movements allow the valve body 25 to move between the full-open position and the full-close position.

Next, in the gate valve of the first embodiment, operation is described in which the valve body 25 moving to the upper end of the opening stroke as the full-close position makes L-motion movements (pendular movements), thereby causing the valve-body seal material 26 to pressure the seal surface 31 as in a substantially parallel state to bring a valve full-close state. This operation corresponds to the left side of FIG. 5 (the height of the valve body 25), FIG. 6B to FIG. 6C, and FIG. 7B to FIG. 7C. Here, a range of the valve body 25 making L-motion movements corresponds to a piston stroke $L_2$ of the cylinder mechanism 9 depicted in FIG. 6C. FIG. 6C depicts a full stroke L, which is a sum of the opening stroke and the L-motion movement stroke ($L_1+L_2$).

As described above, also after the ascent of the fulcrum roller 6 is is locked by the stopper part 7a, the cam member 8 (piston rod 13) continues ascending. When the fulcrum roller 6 is engaged with the stopper part 7a, the spring 4 cannot move the valve-body open/close driving body 2 to an upper direction. Thus, from this point onward, to cause the piston rod 13 to ascend more, it is required to supply compressed air to the lower air chamber 16. By appropriately performing this adjustment of the differential pressure between the upper and lower air chambers 16 and 17, the vertical movements of the valve body 25 can be continuously made at a necessary speed.

In FIG. 6C, normally, that is, when the resilience of the spring 4 to the upper direction is appropriately kept, the engagement state of the fulcrum roller 6 with the stopper part 7a is also appropriately kept by this resilient force. The position (height) of the valve-body open/close driving body 2 is also kept at this position. Also, if the cam groove 12 (piston rod 13) further continues ascending, the cam member 8 side hardly moves in a lateral direction in FIG. 6C as described above. On the other hand, as for the valve-body open/close driving body 2 with its orientation maintained at the two upper and lower points, the fulcrum roller 6 below is engaged with the stopper part 7a and the movements in the upper direction and the lateral direction are locked, but the cam roller 5 above can freely move in the lateral direction. Thus, the cam roller 5 descends (moves) while giving a counterforce and a friction force to the cam groove 12.

Here, the cam roller 5 descending along the cam groove 12 moves along the tilted part 12b. Thus, in FIG. 6C, by taking the fulcrum roller 6 below with its movements locked by the stopper part 7a as a fulcrum, the cam roller 5 side (valve-body open/close driving body 2 side) has to be moved in a tilted manner in a lateral direction in FIG. 6C by the tilt amount of this tilted part 12b. Therefore, at least while the cam roller 5 is moving along the tilted part 12b, the valve body 25, the stem 28, and the valve-body open/close driving body 2 make an L-motion movement as a whole, with the fulcrum roller 6 below in FIG. 6C taken as a fulcrum, the cam roller 5 receiving a tilted movement force from the cam groove 12 taken as a point of effort, and the valve body 25 at the upper tip taken as a point of load. The swing width (angle) and speed of this L-motion movement can be adjusted at least based on the shape design such as the length and the tilt of the cam groove 12.

As depicted in FIG. 6C, this L-motion movement continuously supplies compressed air to the lower air chamber 16 to push the piston 14 down, and this continues until the piston 14 ascends to the upper end position of the cylinder where the capacity of the upper air chamber 17 is eliminated. During this, the cam roller 5 goes via the tilted part 12b to reach the flat part 12c, stops moving in this region of the flat part 12c (or due to engagement with the arc part 12d), and causes the valve body 25 to become in a full-close state. A positional relation between the L-motion movement of the valve body 25 and the cam groove 12 can be set as appropriate. For example, the positional relation may be set so that the valve-body seal material 26 makes contact with the seal surface 31 when the cam roller 5 is positioned in the course of the tilted part 12b or so that the valve-body seal material 26 makes contact with the seal surface 31 at a boundary position between the tilted part 12b and the flat part 12c.

More specifically, if the tilting of the valve body 25 is set so that the valve-body seal material 26 makes contact with the seal surface 31 when the cam roller 5 comes at a position in the course of the tilted part 12b, it is possible to make an intermediate position of the piston stroke $L_2$ correspond to this contact position of the seal surface 31. Thus, the cam roller 5 can be further moved in the remaining range of the tilted part 12b and the flat part 12c (the remaining piston stroke $L_2$). This is suitable because a closing margin for pressurizing the seal surface 31 by further giving an L-motion movement force (pressing force by tilting) from the state in which the valve body 25 makes contact with the seal surface 31 can be sufficiently ensured. In the region of the flat part 12c, even if the cam roller 5 moves, the valve body 25 hardly performs an L-motion movement. The region of this flat part 12c mainly functions as a lock region to maintain the state of the valve-body seal material 26 pressurizing the seal surface 31.

While the cam roller 5 is moving in the cam groove 12 (tilted part 12b), the cam groove 12 side receives a reaction of giving a tilted movement force to at least the cam roller 5 side. Since the components of this reaction in a horizontal direction are large, the cam member 8 is pushed back to a direction of an inner wall of the housing body 3 and can be slightly positionally shifted. However, as described above, the cam receiving roller 19 and the bearing 20 are arranged to be opposed to each other. Thus, this positional shift of the cam member 8 while making vertical movements can be appropriately supported.

Furthermore, when the valve-body open/close driving body 2 ascends, even if the upward resilient force of the spring 4 is lost and thus the cam roller 5 becomes disengaged by its own weight from the narrow-width part 12a, the tilting of the valve-body open/close driving body 2 is immediately locked by exertion of the function of the vertical movement guiding part α. Therefore, the tilted orientation of the valve-body open/close driving body 2 is ensured similarly to the normal case with resilience of the spring 4 being present to some extent. Also in this state, if the valve-body open/close driving body 2 comes at the full-close position, the height position of the upper end part 21b in the valve main body 1 is approximately equal to or slightly lower than the height position of the step part 22b. Thus, when the step part 22b reaches the height of the upper end part 21b, the side part 22a that is about to tilt is unlocked to protrude so as to override the upper end part 21b for engagement. With this unlocking of tiling, the cam roller 5 can move inside the cam groove 12. Thus, with exertion of the function of the L-motion movement guiding part β, the L-motion movement of the valve body 25 is also ensured similarly to the normal case with resilience of the spring 4 being present to some extent.

Therefore, in the valve of the present invention, not only in the normal case but also with exertion of the functions of the vertical movement guiding part α and the L-motion movement guiding part β, the L-motion movement of the valve-body open/close driving body 2 is reliably ensured even if the case is not the normal case as described above, for example, even if setting is equal to or lower than a spring load acquired by adding the weight of the valve-body open/close driving body 2 and the load of acceleration together. Also, the vertical movement guiding part α and the L-motion movement guiding part β are portions not function at normal times, and thus have favorable durability as retaining members.

Thus, in any case, there is no fear that the expensive valve-body seal material 26 makes contact or collide with another member such as the body 33 to be damaged during vertical movements. Also, the contact orientation and angle of the valve body 25 with respect to the seal surface 31 when the valve-body open/close driving body 2 performs an L-motion movement can be appropriately retained. Therefore, a kink, rubbing, and sliding can be prevented from occurring when the valve-body seal material 26 is seated on or leaves from the seal surface 31, and thus a reliable low occurrence of particles in the valve can be ensured.

As described above, in a gate valve of the L-motion movement (J movement) type which uses the cam mechanism to swing the valve body in a pendular manner for valve closing, in many conventional techniques, the fulcrum position of an L-motion movement of the valve body and the vertical movement member including the valve body is an intermediate position near the valve body. By contrast, in the valve of the present invention, the fulcrum position is provided at a lower end position farthest away from the valve body. Here, if a distance between the valve body and the seal surface necessary before the valve body makes an L-motion movement to close the valve is the same, as the fulcrum of the L-motion movement is nearer to the valve body, the angle of the L-motion movement required for the stem increases. As the angle of the L-motion movement increases, the tilt of the valve body and the seal surface at the time of full-closing (closing) increases, and thus a kink and rubbing between the valve-body seal material and the seal surface increases to inhibit a low occurrence of particles. By contrast, in the valve of the present invention, the fulcrum of the L-motion movement is positioned farthest away from the valve body. Thus, at least in this structural sense, the valve of the present invention is the most suitable for a low occurrence of particles.

Also, in the valve-close state of the valve body 25, the valve body 25 closes the seal surface 31 as described above. Thus, the valve body 25 is in a state of receiving a counterforce from a direction substantially perpendicular to this seal surface 31. In particular, this counterforce is conspicuous when the elastic resilient force of the valve-body seal material 26 is large. In the full-close state depicted in FIG. 6C, while the valve body 25 receives a counterforce in a substantially rightward direction in the drawing, the cam roller 5 receives a counterforce in a substantially leftward direction in the drawing from the flat part 12c of the cam groove 12. Thus, the valve body 25 and the valve-body open/close driving body 2 are under constraint, with the whole vertically and integrally receiving the forces in the leftward and rightward directions. Furthermore, normally, the valve-body open/close driving body 2 receives from the spring 4 an upward resilient force also from the lower recessed surface 2c.

Thus, in the valve of the first embodiment, in the full-close state, a descending force hardly occurs to the valve-body open/close driving body 2, and it is thus possible to release the driving force by discharging the compressed air form the cylinder mechanism 9. Thus, in the valve of the first embodiment, in the full-close state, it is not required to provide a lock mechanism for preventing the valve body 25 to descend, and thus the valve can be simply configured and a driving source for maintaining the full-close state can be omitted.

Furthermore, in this full-close state, the valve body 25 and the cam roller 5 receive a counterforce in reverse to the lateral direction as described above. Thus, a bending force acts on at least the valve-body open/close driving body 2 and the stem 28. However, if the valve-body open/close driving body 2 is configured, irrespective of the material or shape, so as to exert high stiffness to the extent of being hardly bent even if this closing force in the full-close state or the like acts, the whole bending can be reduced, and the tilt of the valve body 25 can be reduced accordingly. In this case, in the full-close state, a tilt, kink, and rubbing between the valve-body seal material 26 and the seal surface 31 can be reduced, and thus the valve of the first embodiment is further suitable for a low occurrence of particles in the valve.

Thus, with the resilient state by the spring 4, the cam roller 5 moves in the cam groove 12 with the state in which the fulcrum roller 6 is locked by the stopper part 7a being kept. With this, the valve-body open/close driving body 2 performs L-motion movements (pendular movements), with the fulcrum roller 6 taken as a fulcrum and the cam roller 5 taken as a point of effort. With this L-motion movement, the valve-body seal material 26 serves as a point of load to pressurize the seal surface 31.

Also, the two housing bodies 3 on both sides have a bilaterally symmetrical structure, and does not include a coupling body for synchronizing these two bodies and are provided independently. Thus, in addition to simplification of the valve, a contribution is made also to facilitation of assembling. Synchronization of intake and exhaustion of driving air to and from these two left and right housing bodies 3 has a simple structure in which the length of an operation air plumbing flow path or the like is set to be the same, thereby causing intake and exhaustion of air to be both performed at approximately the same time.

A movement of opening the valve to a full-open state from the above-described full-close state is basically reverse to the movement from the above-described full-open state to a full-close state. In particular, in the full-close state, the valve-body seal material 26 is pressurized onto the seal surface 31 for closing. Thus, to open the valve, it may be required to make the valve body 25 away from the seal surface so that the close-contact state is peeled off. In this case, the L-motion movement guiding part β of the present invention appropriately functions as follows.

That is, to open the valve, the valve body 25 is caused to perform an L-motion movement only by cam activation (movement of the cam roller 5 in the cam groove 12). Thus, for example, when the valve-body seal material 26 is non-uniformly adhered to the seal surface 31, a non-uniform force acts also on the valve body 25. Only with cam activation, the valve body 25 is kept in parallel with the seal surface 31 and becomes difficult to be peeled off. Among others, a force of causing the valve body 25 to descend is difficult to act. Thus, there is a fear that an unwanted kink or rubbing occurs between the valve-body seal material 26 and the seal surface 31 or the valve-body seal material 26 may be destroyed.

By contrast, in the valve of the present invention, even if a force of causing the valve body 25 to descend occurs when the valve-body seal material 26 is peeled off from the seal surface 31, at least the downward movement of the valve-body open/close driving body 2 (valve body 25) is immediately locked by the L-motion movement guiding part β. Also, the valve body 25 is kept substantially in parallel with the seal surface 31 and easily go away therefrom. To say the least, there is no fear that the descent of the valve body 25 causes a kink and rubbing to occur between the valve body 25 and the seal surface 31.

Furthermore, normally, in the valve of the present invention, the valve-body open/close driving body 2 is always elastically pushed in a direction of valve closing (upper direction). Thus, the driving force of the cylinder mechanism 9 in the valve-closing direction (ascending direction) can be supported by the elastic member (spring 4). Thus, the valve-closing movement speed can be appropriately increased. Also as described above, the sealing force in the full-close state can be supported, and a lock mechanism for maintaining the full-close state can be omitted.

Furthermore, in the valve of the present invention, by providing the valve with the above-described movement guiding mechanism, even if the resilient force of the spring 4 is lost, the vertical movements and the L-motion movements of the valve-body open/close driving body 2 can be ensured. Thus, from this point of view, the valve of the present invention can be configured as a valve without an elastic member (spring 4) or a fixed base part (cylinder head 10). That is, a vacuum gate valve without the spring 4 or the cylinder head 10 and configured of the valve-body open/close driving body 2 and the housing bodies 3 each including the cylinder mechanism 9 in a manner similar to the above can be acquired.

Figure 9:
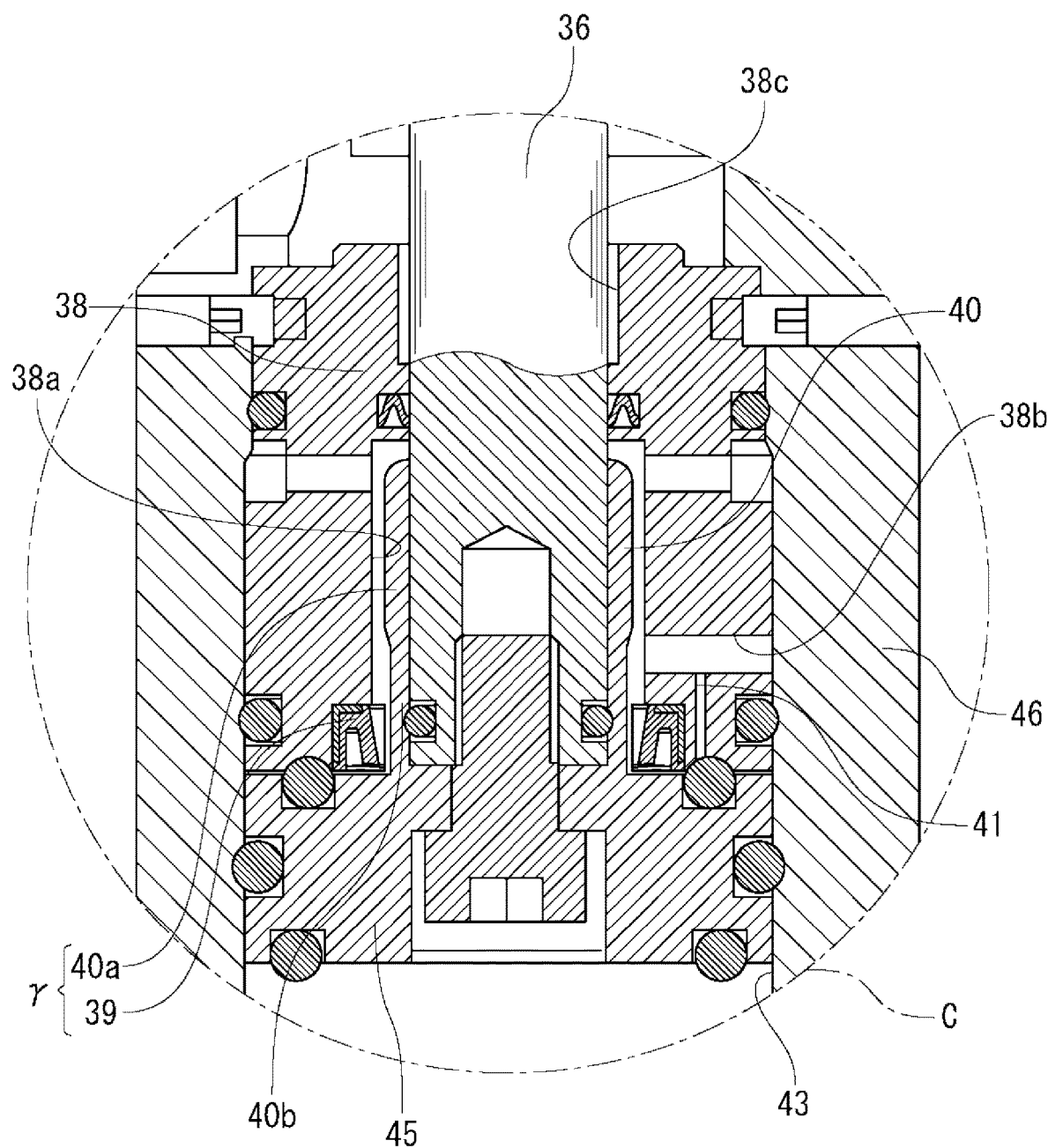
FIG. 9 is an enlarged cross-sectional view of a circle C of FIG. 8C.
Figure 10:
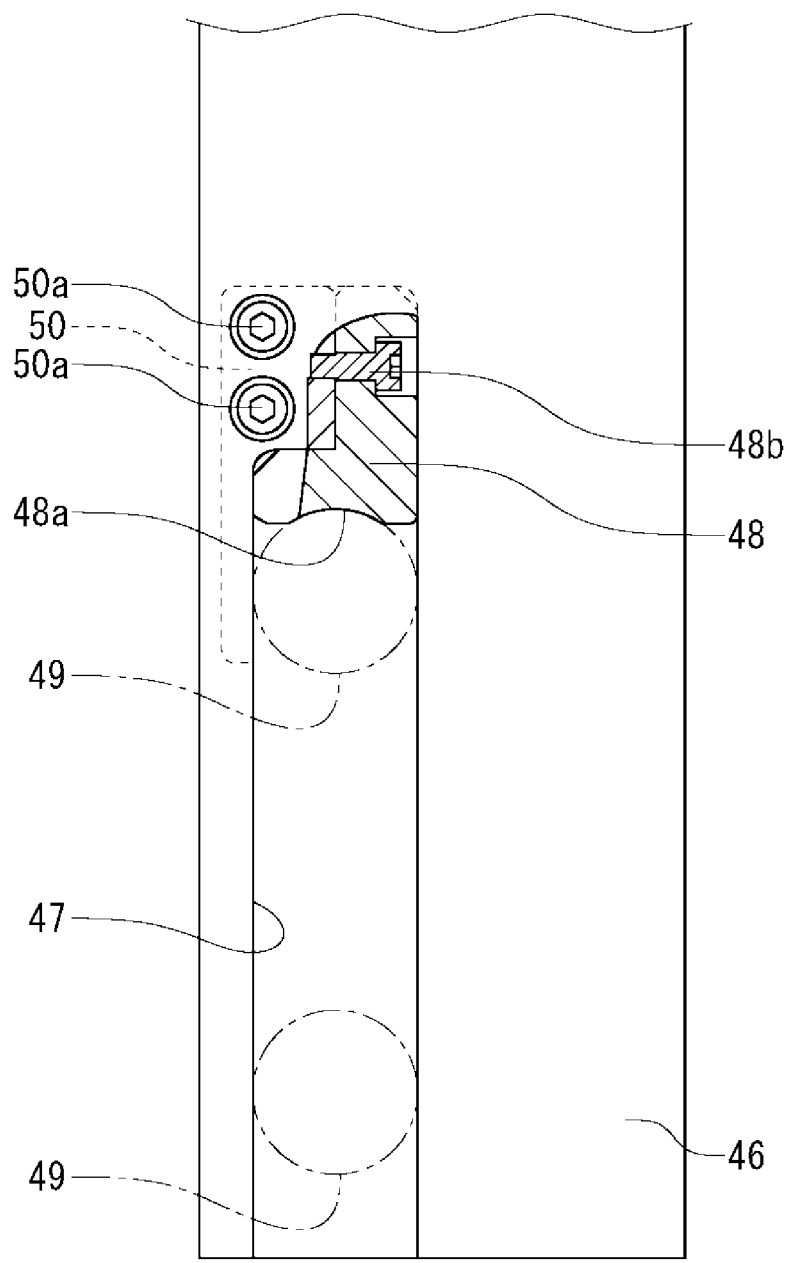
FIG. 10 is a partially notched cross-sectional view of a housing body having still another example structure of the present invention.

Next, another example structure of the first embodiment of the present invention is described. FIG. 8A to FIG. 8C are cross-sectional views of another cylinder mechanism 9 of this other example structure. FIG. 9 is an enlarged cross-sectional view of a circle C of FIG. 8C. FIG. 10 is a partially notched cross-sectional view of a housing body 46 of the other example structure.

In the valve of the first example described above, when the ascending speed of the valve body 25 from the full-open position to the full-close position is increased too much, when the fulcrum roller 6 collides with the stopper part 7a, an impact due to this collision may be too large and vibrations may occur to the valve main body 1 and the body 33. Similarly, when the speed of causing the valve body 25 to perform an L-motion movement is increased too much, when the valve-body seal material 26 is seated on the seal surface 31, an impact due to this seating may be too large and the valve-seal material 26 may be damaged and/or particles may occur. By contrast, to address this these problems while the average opening/closing speed of the valve over the full stroke L is appropriately maintained at high speeds, it is required to appropriately decelerate the movements at least before and after the fulcrum roller 6 collides with the stopper part 7a and before and after the valve-body seal material 26 collides with the seal surface 31.

Thus, in the other example structure below, a mitigating mechanism is provided which can mitigate the movement of the fulcrum roller 6 of the valve-body open/close driving body 2 colliding with the stopper part 7a in vertical movements and the movement of the valve body 25 colliding with the seal surface 31 in an L-motion movement. In the valve of the other example depicted in FIG. 8A to FIG. 8C, this mitigating mechanism is formed of any one of a cam member 37 in which the length of a cam groove 44 is formed so that the L-motion movement stroke $L_2$ of a piston rod 36 is 25% to 35% of the full stroke L, a piston cushioning mechanism γ provided to a piston 45 in a cylinder mechanism 35, and an orifice 41 provided in a piston bearing 38 of the piston rod 36, or any combination thereof. The other example structures other than this mitigating mechanism are similar to the valve structure of the first embodiment described above.

In the cam member 37 of the other example, the length of the cam groove 44 is adjusted so that the L-motion movement stroke $L_2$ of the piston rod 36 is 25% to 35% of the full stroke L. As with the valve of the first embodiment described above, also in the valve of the other example, if the L-motion movement stroke $L_2$ indicates that a cam roller not depicted is released from the engagement with the width-narrow part to move as fitting in the cam groove 44 and is then engaged with the arc part at a lower end of the cam groove 44 to become a full-close state, the full length of the cam groove 44 substantially directly corresponds to the height of the L-motion movement stroke $L_2$ by the piston rod 36. Thus, by adjusting the length of the cam groove 44, it can be set so that the L-motion movement stroke $L_2$ is 25% to 35% of the full stroke L.

For example, when the L-motion movement stroke $L_2$ of the piston rod 36 is set to be short on the order of 16% of the full stroke L, the moving speed of the $L_2$ stroke is decreased on the order of ⅕ of the moving speed of the $L_1$ stroke. However, when the L-motion movement stroke $L_2$ is set to be long on the order of 25% to 35% of the full stroke L as described above, the L-motion moving speed of the valve body can further be decreased on the order of ⅛ to 1/12 (1.6 times to 2.4 times, compared with the above-described case in which the L-motion movement stroke $L_2$ is set to be short). When the L-motion movement stroke $L_2$ is set to be long in this manner, for example, even if the moving speed from the full-open state to the full-close state is increased from the order of 0.8 seconds to 1.0 seconds to the order of 0.4 seconds to 0.5 seconds, it has been confirmed that vibrations when the valve body collides with the seal surface are reduced to a degree similar to collision vibrations in conventional gate valve without adjustment of the length of the cam groove.

Furthermore, with an increase of the length of the cam groove 44 (height direction of the cam member 37), the L-motion movement force of the valve body by the cam member 37 (fastening force of the valve body to pressure the seal surface) can also be appropriately enhanced. Thus, if the necessary fastening force is the same, the required driving force of the cylinder mechanism 35 is decreased, thereby decreasing the diameter of the piston 45. Thus, the valve main body can be configured to be further compact and thin.

Next, as depicted in FIG. 8A to FIG. 8C and FIG. 9, the valve of the other example includes, as a mitigating mechanism in the cylinder mechanism 35, the piston cushioning mechanism γ provided to the piston 45 in the piston rod 36 and the orifice 41 provided in the piston bearing 38 of the piston rod 36. However, structures other than these are similar to the valve structure of the first embodiment described above.

In FIG. 8A to FIG. 8C and FIG. 9, the piston bearing 38 of the other example is firmly fixed to an upper end of the inner circumference of an upper air chamber 42 via a seal material. The piston rod 36 is axially supported by an insertion part 38*c* of this piston bearing 38 via a seal material. On a lower side of this insertion part 38*c* in the drawings, a diameter-expanded part 38*a* with its inner diameter expanded is formed to ensure a gap between the insertion part 38*c* and the outer circumferential surface of the piston rod 36. Also, inside the piston bearing 38, an air flow path 38*b* is formed so as to be able to communicate to a flow path (not depicted) in a housing body 46 communicating to the upper air chamber 42. This air flow path 38*b* is connected to the inside of the diameter-expanded part 38*a*.

In FIG. 8A to FIG. 8C and FIG. 9, the piston cushioning mechanism γ is formed of a combination of a cushion gasket 39 and a rod insertion part 40. The cushion gasket 39 is a V gasket or U ring, and is provided to an opening side of the diameter-expanded part 38*a* of the piston bearing 38 of the other example, with a valley side toward the piston 45. In this other example structure, as depicted in FIG. 9, an outer diameter side of the cushion gasket 39 is firmly fixed to a metal fitting having an L-shaped cross section. When this cushion gasket 39 is fixed to an opening of the diameter-expanded part 38*a* of the piston bearing 38, the cushion gasket 39 is press-fitted and fixed integrally with this metal fitting toward the opening.

Also, the rod insertion part 40 is a cylindrical portion with a part of the piston 45 being extended so as to cover the piston rod 36 firmly fixed with insertion of a bolt. On a piston 45 side, a small-diameter part 40*b* (clearance part) recessed to have a thin material thickness is formed. Next to this small-diameter part 40*b*, a large diameter part 40*a* formed to have a constant material thickness slightly thicker than the small-diameter part 40*b* is formed.

In FIG. 8A to FIG. 8C and FIG. 9, the orifice 41 is provided on a lower side of the piston bearing 38 to have a predetermined narrow diameter as an air flow path connecting the inside of the upper air chamber 42 and the air flow path 38*b* inside the piston bearing 38.

Next, in the valve of the other example, the operation of mitigating the moving speed of the valve by the mitigating mechanism from the full-open position to a full-close state is described. The operation between full-open and full-close as a gate valve (valve opening/closing movement) is similar to that of the valve of the first embodiment described above.

FIG. 8A is a cross-sectional view of the cylinder mechanism 35 in another example in which the piston rod 36 is at a position immediately before the fulcrum roller not depicted collides with the stopper part (the piston 45 is at a position slightly lower than the upper end position of the opening stroke $L_1$). From the full-open position where the piston 45 is at a lower end part to a position depicted in FIG. 8A, the piston rod 36 is caused to ascend at high speeds, compared with the valve of the first embodiment.

Next, FIG. 8B depicts a state in which the piston rod 36 further ascends from FIG. 8A and the large-diameter part 40*a* of the rod insertion part 40 slides with the cushion gasket 39. This state corresponds to being in the course of an L-motion movement of the valve body not depicted toward the seal surface. With exertion of the function of the piston cushioning mechanism γ, that is, with sliding of the large-diameter part 40*a* and the cushion gasket 39, the ascending speed of the piston rod 36 can be decreased even with the same driving force. Then, after the large-diameter part 40*a* passes through the cushion gasket 39, the cushion gasket 39 exits to the small-diameter part 40*b*. However, since the small-diameter part 40*b* is set so as be substantially not in contact with the cushion gasket 39, the ascending speed of the piston rod 36 is again increased.

Any structure of the piston cushioning mechanism γ, that is, any type and characteristic of the cushion gasket 39 and any outer diameter, length, and so forth of the large-diameter part 40*a*, can be set in accordance with implementation. In the valve of the other example in the drawings, the stroke (deceleration stroke) of the piston rod 36 where the large-diameter part 40*a* and the cushion gasket 39 slide each other is set to include an upper end position of an opening stroke where the fulcrum roller collides with the stopper part (locking point) and an intermediate position of the L-motion movement stroke where the valve body collides with the seal surface (valve-body contact point). That is, with reference to FIG. 6C for description, the locking point is an upper end position of $L_1$, and the valve-body contact point is present at a point in the course of $L_2$. The deceleration stroke is set so as to cover these two points. By setting in this manner, the cushioning operation of the piston cushioning mechanism γ can appropriately decelerate the movements at any point.

Next, FIG. 8C and FIG. 9 depicts a state in which, subsequent to FIG. 8B, the cushion gasket 39 exits to the small-diameter part 40*b* and then returns to perform a high-speed movement to ascend and the piston 45 reaches the upper end position to cause the valve to become in a full-close state. As described above, since the deceleration stroke includes the valve-body contact point, the movement from FIG. 8B to FIG. 8C substantially corresponds to a stroke for pressurizing the seal surface after the valve body collides with the seal surface. In this manner, the series of FIG. 8A to FIG. 8C is a so-called three-step variable speed movement from a high speed to deceleration and then from deceleration to a high speed again. Originally, a main object of the present invention is to increase the speed of valve movements, and deceleration and mitigation are merely a treatment for collision and vibrations, and thus deceleration is required to be minimized. However, with the introduction of the simple piston cushioning mechanism γ as described above, a minimum deceleration movement can be easily introduced or adjusted for a required range, and appropriate reduction in deceleration time can be achieved.

As for the orifice 41, as depicted in FIG. 8B and FIG. 9, air in the upper air chamber 42 is compressed while the piston rod 36 ascends, and thus has to be discharged via the air flow path 38*b*. However, since the cushion gasket 39 makes contact and slides with the outer circumferential surface of the piston rod 36 and a valley side of the V gasket 39 is oriented toward the upper air chamber 42, if the air pressure acts on this valley side, the contact between the V gasket 39 and the piston rod 36 is enhanced, and thus air can hardly pass therebetween and air is hardly discharged from the opening of the air flow path 38*b* on a diameter-expanded part 38*a*.

Thus, the air in the upper air chamber 42 flows into the orifice 41. This orifice 41 is formed to have a predetermined narrow diameter to narrow down the discharge of air. Thus, the orifice 41 can mitigate the discharge of air in the upper air chamber 42 as appropriate when the piston rod 36 ascends. This mitigation appropriately mitigates the pressure-reducing speed of the inner pressure of the upper air chamber 42, and can contribute to mitigation of the ascending speed of the piston rod 36.

While the function of the piston cushioning mechanism γ is not exerted, that is, while the small-diameter part 40*b* is positioned so as to be opposed to the cushion gasket 39, a gap occurs between the cushion gasket 39 and the outer circumferential surface of the piston rod 36. Thus, the air in the upper air chamber 42 is discharged through this gap when the piston rod 36 ascends. During this time, the mitigating function of the orifice 41 do not work.

Furthermore, from the full-close state to the full-open position, that is, from the upper end position to the lower end position of the full stroke L, the mitigating function by the piston cushioning mechanism γ and the orifice 41 do not work. In particular, as for the piston cushioning mechanism γ, the cushion gasket 39 is attached with its mountain side oriented upward (insertion part 38*c* side). Thus, even if the piston rod 36 descends at the time of valve opening to bring the large-diameter part 40*a* in contact with the cushion gasket 39, a sliding force which inhibits the movement of the piston rod 36 hardly occurs, and air can also smoothly pass. Thus, a smooth descent can be made from the upper end position to the lower end position in the full stroke.

As described above, in the other example structure, the mitigating mechanism configured of only a combination in a simple structure is provided, thereby allowing an impact when the fulcrum roller collides with the stopper part and an impact when the valve-body seal material collides with the seal surface to be appropriately mitigated. Also, vibrations at the time of valve opening and closing and the occurrence of particles from the valve-body seal material can be reduced. Furthermore, the valve opening/closing speed can be increased as appropriate. Still further, in accordance with the range of the valve stroke, that is, each movement as a mitigation target, selection can be made as an appropriate mitigating mechanism. While the speed of the L-motion movements for swinging the valve body (pendular movements) can be decreased only by providing a long cam groove, as described above, it goes without saying that the speed can be appropriately decreased without adopting means of increasing the length of the cam groove (by another means). In this case, the valve size can be appropriately reduced in a compact form.

FIG. 10 depicts a partially notched cross-section of an enlarged lower part of the inner side surface of the housing body 46 of the above-described other example structure. In FIG. 10, as a stopper part 48*a* which locks the ascent of a fulcrum roller 49 in the other example structure indicated by a dotted line, a cushioning structure using a cushion pad 48 is adopted to mitigate the collision of the fulcrum roller 49 with the stopper part 48*a*. This cushioning structure may also be included in the above-described mitigating mechanism to configure a valve.

Specifically, a bushing 50 is firmly fixed to the housing body 46 at an upper end portion of a vertical-movement guiding part 47 of the other example with bolts 50*a*. To this bushing 50, the cushion pad 48 is firmly fixed with a bolt 48*b* to provide the above-described cushioning structure. A lower end face 48*a* of the cushion pad 48 serves as the stopper part 48*a* which lock the ascent of the fulcrum roller 49. FIG. 10 depicts the fulcrum roller 49 with its ascent locked at a position of a top dead center. As engaged with this fulcrum roller 49, the stopper part 48*a* is elastically deformed in a slightly arc shape to receive the fulcrum roller 49. This elastic deformation mitigates a collision of the fulcrum roller 49 with the stopper part 48*a*.

Figure 11:
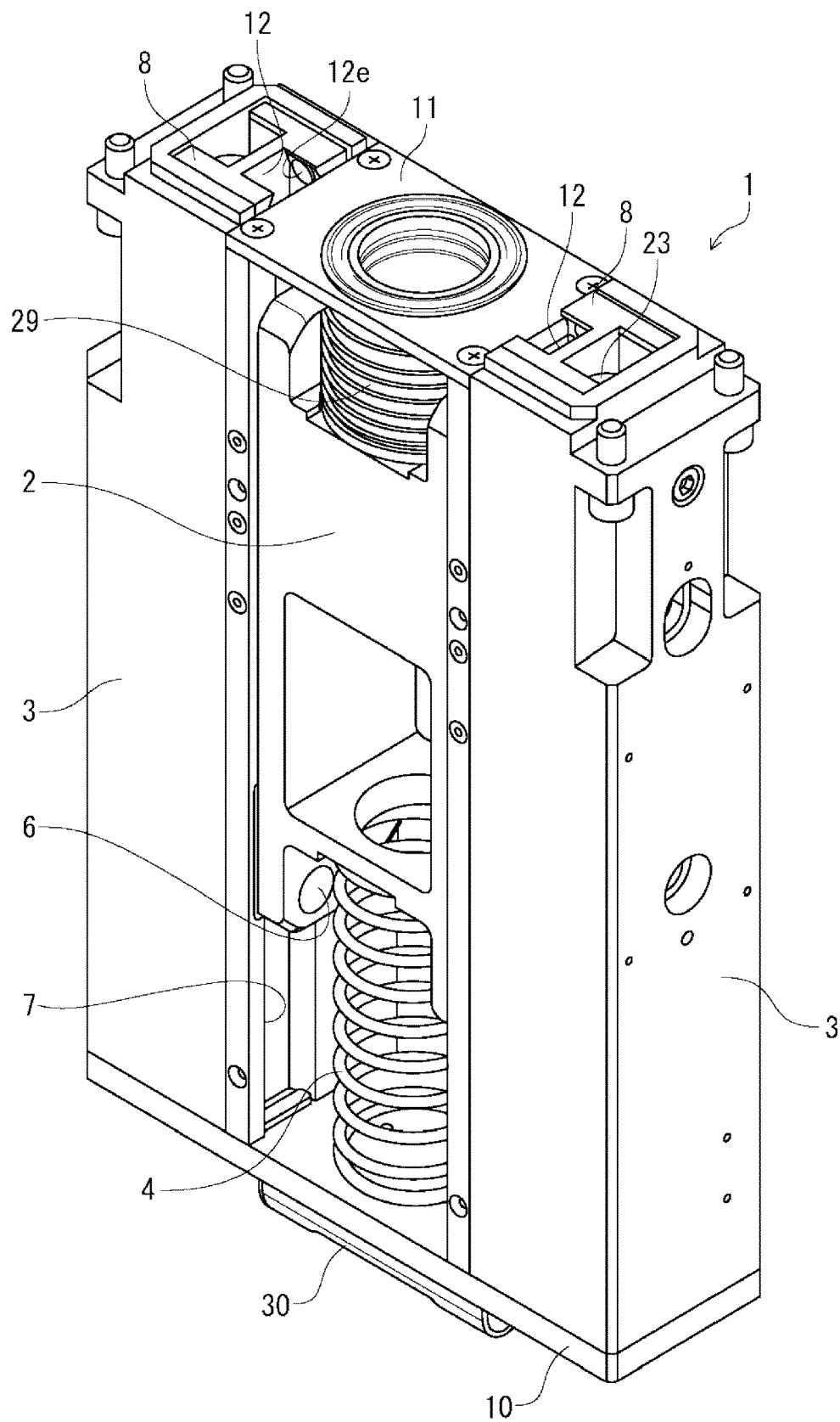
FIG. 11 is a perspective view of an assembled valve main body of a second embodiment.

Next, in FIG. 11 to FIG. 17, a second embodiment of the present invention is described in detail below. Since this second embodiment is an improvement of the above-described first embodiment and the basic structure and operation of the second embodiment is common to those of the first embodiment, the same portion is provided with the same reference character is not described herein. As with FIG. 1, FIG. 11 is a perspective view of the assembled valve main body 1 of the second embodiment. As with FIG. 2, FIG. 12 is an exploded perspective view of FIG. 11.

In the second embodiment, an improvement is made from a viewpoint similar to that of the mitigating mechanism of the first embodiment described in FIG. 8 to FIG. 10 (the other example structure of the first embodiment). That is, the first embodiment is subjected to an improvement for further reducing impulsive sound and vibrations conspicuous in high-speed opening/closing movements of the valve body 25 to acquire the second embodiment. A mitigating mechanism of the second embodiment is configured to cushion a collision of the fulcrum roller 6 with an elastic bushing 48 for roller reception (cushion pad 48 of the stopper part 7*a*) and also cushion its reverse movement, that is, a collision between the stopper part (narrow-width part 12*a*) at the upper end of the cam groove 12 and the cam roller 5 when the valve body 25 performs ascending and descending movements. Also, the mitigating mechanism is configured to be able to mitigate a contact of the piston 14 with the piston bearing 15 at the time of the movement of the valve body 25 colliding with the seal surface 31, that is, at the time of full closing, in an L-motion movement and also mitigate a contact of the piston 14 with the cylinder head 10 at the time of full opening.

Specifically, firstly, a cushioning structure similar to the cushioning structure (the other example structure of the first embodiment) depicted in FIG. 10 is provided. By this cushioning structure, the vertical movement guiding part 7 is shortened. Thus, to ensure a necessary opening stroke, as depicted in FIG. 11 and FIG. 12, the valve main body 1 of the second embodiment is slightly longitudinally elongated as a whole, compared with the valve main body 1 of the first embodiment depicted in FIG. 1 and FIG. 2. It goes without saying that any change in the dimensions and shapes of members can be selected as appropriate in accordance with implementation. Also, in addition of appropriate changes in the dimensions and shape of the cam groove 12 of the cam member 8, a bushing 12*e* made of rubber or resin is provided at a position of this cam groove 12 where the cam roller 5 is engaged. Furthermore, the cylinder mechanism 9 is provided with two piston cushioning mechanisms δ different from that of the first embodiment on both end sides of the stroke of the cylinder mechanism 9. These piston cushioning mechanisms δ are configured to decrease the ascending/descending speed of the piston 14 by the cushion gasket 39 and the orifice 41 (10*d*).

Figure 12:
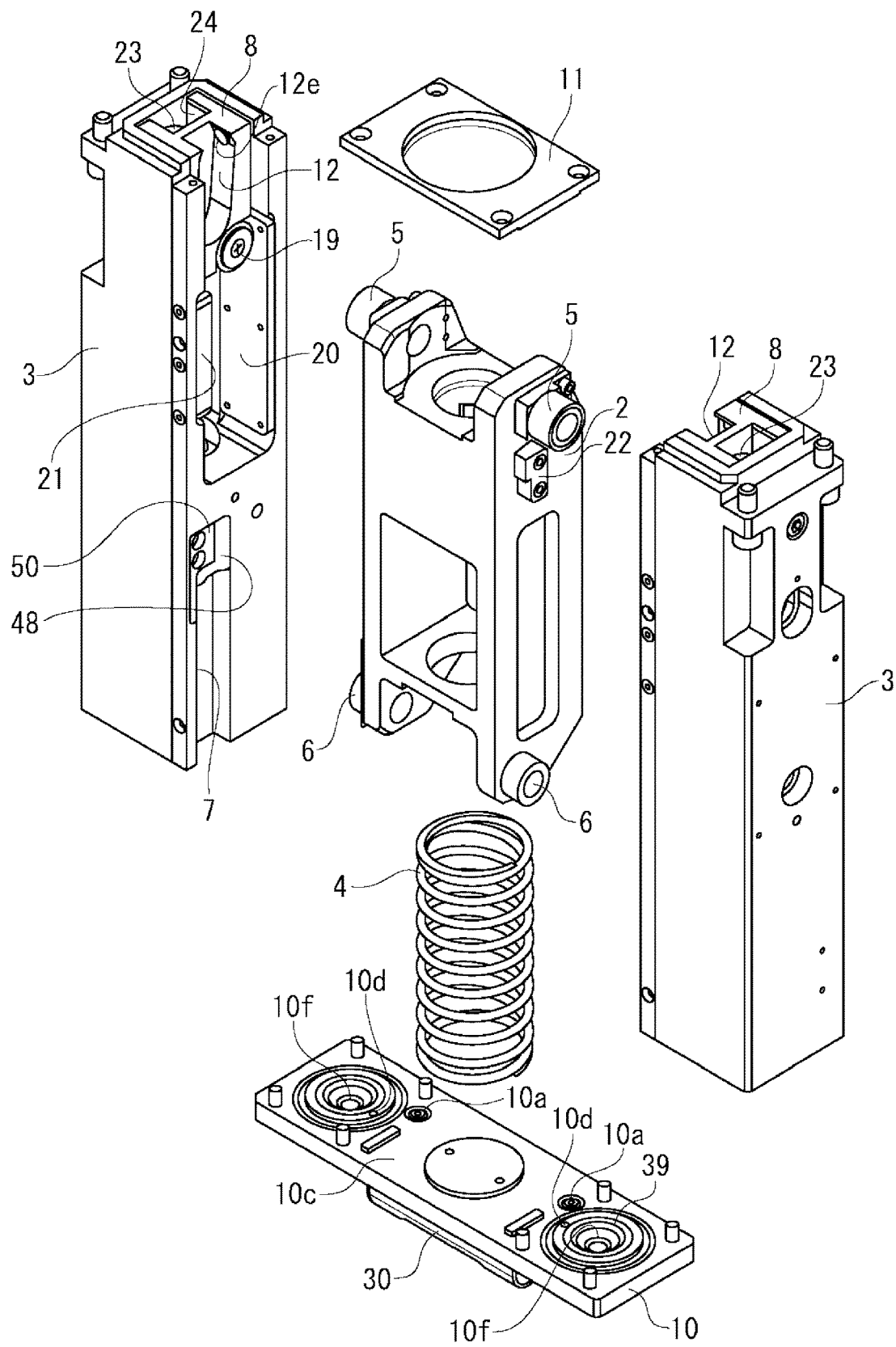
FIG. 12 is an exploded perspective view of FIG. 11.
Figure 13:
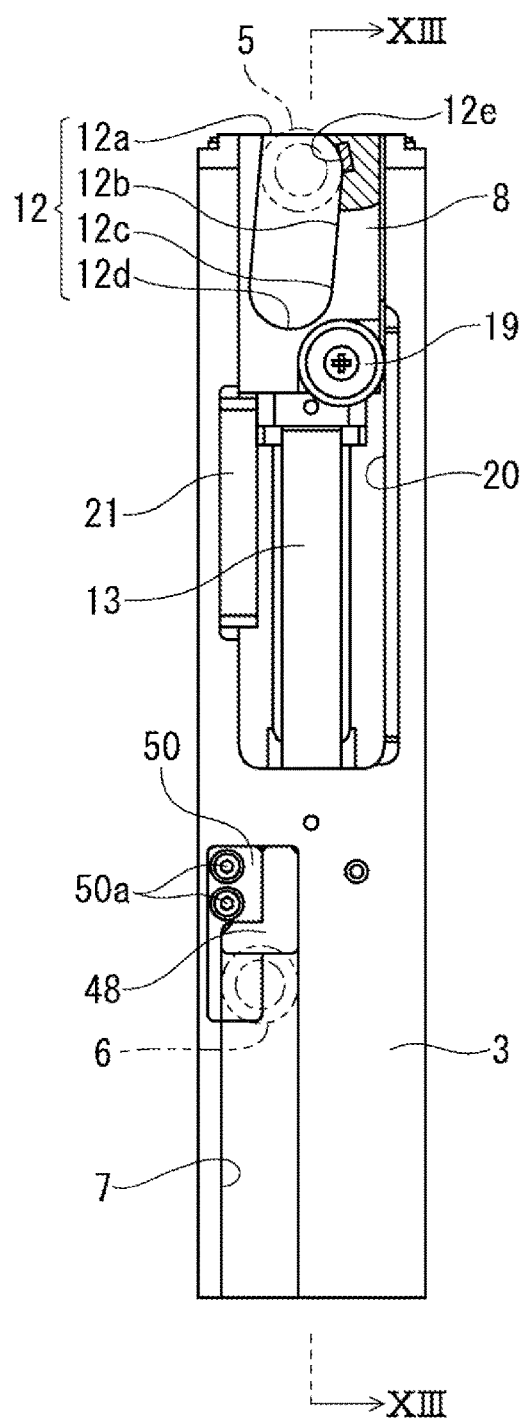
FIG. 13A is a side view of a housing body of the second embodiment viewed from an inner side surface side.
FIG. 13B is a cross-sectional view along a XIII-XIII line of FIG. 13A.
Figure 13:
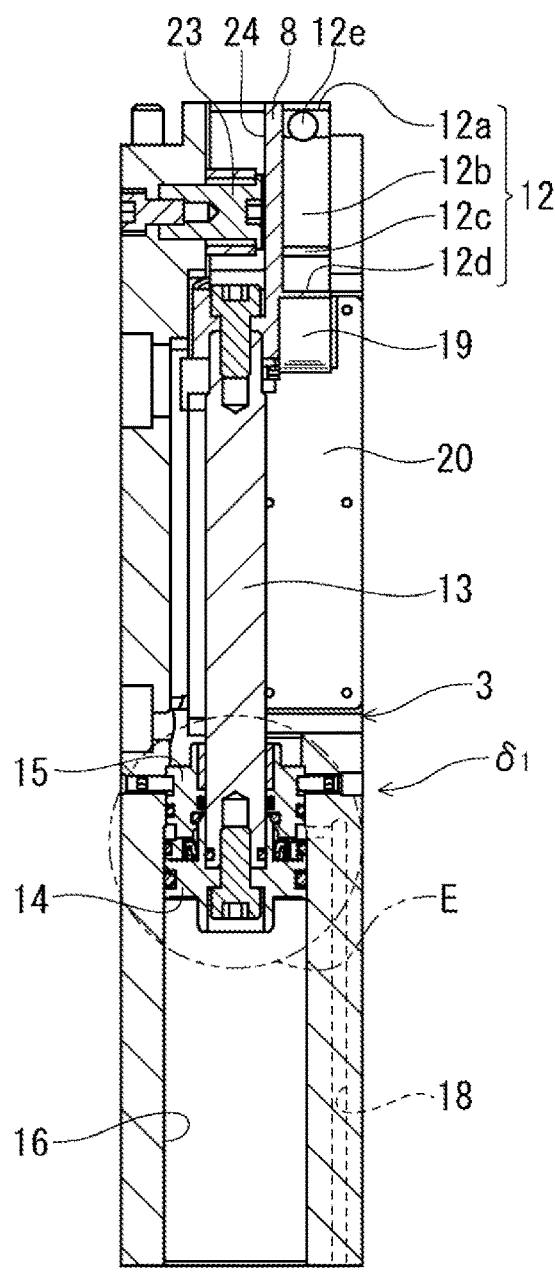

Firstly, in FIG. 12 and FIG. 13A, the cushioning structure (elastic bushing 48 for roller reception) is provided at the position of the stopper part 7*a* of the vertical-movement guiding part 7. Since the cushioning structure of the second embodiment depicted in FIG. 12 and FIG. 13A has a structure and operation substantially identical to that of the cushioning structure depicted in FIG. 10, the same portion is provided with the same reference character in FIG. 10 is not described herein. However, the cushioning structure of the present invention is not limited to this structure, and any structure capable of appropriately cushioning the movement of the ascending fulcrum roller 6 can be selected as appropriate.

Next, as depicted in FIG. 12, FIG. 13A, and FIG. 13B, the elastic bushing 12e for cushioning is provided to the cam groove 12 of the cam member 8 of the second embodiment, and the bushing 12e is used as a cushioning member. In particular, in a state in which the valve body 25 is at the full-close position, from a state in which the cam roller 5 is not engaged with the narrow-width part (stopper part) 12a, the cam member 8 (piston rod 13) descends to cause the cam roller 5 to be engaged with the narrow-width part 12a (a transition is made from the L-motion movement stroke to the opening stroke). At this time, the cam roller 5 collides with the upper end part of the cam groove 12. At a position capable of cushioning this collision, the bushing 12e is provided to be buried. Specifically, as depicted in FIG. 13A, the bushing 12e is provided to a curved-surface portion having an arc cross section where the narrow-width part 12a and the tilted part 12b are connected together, at a position capable of mitigating a pressurizing force by the cam roller 5 as being engaged with the cam groove 12 in the opening stroke. The other structure of the cam member 8 is substantially identical to the structure of the first embodiment.

Figure 15:
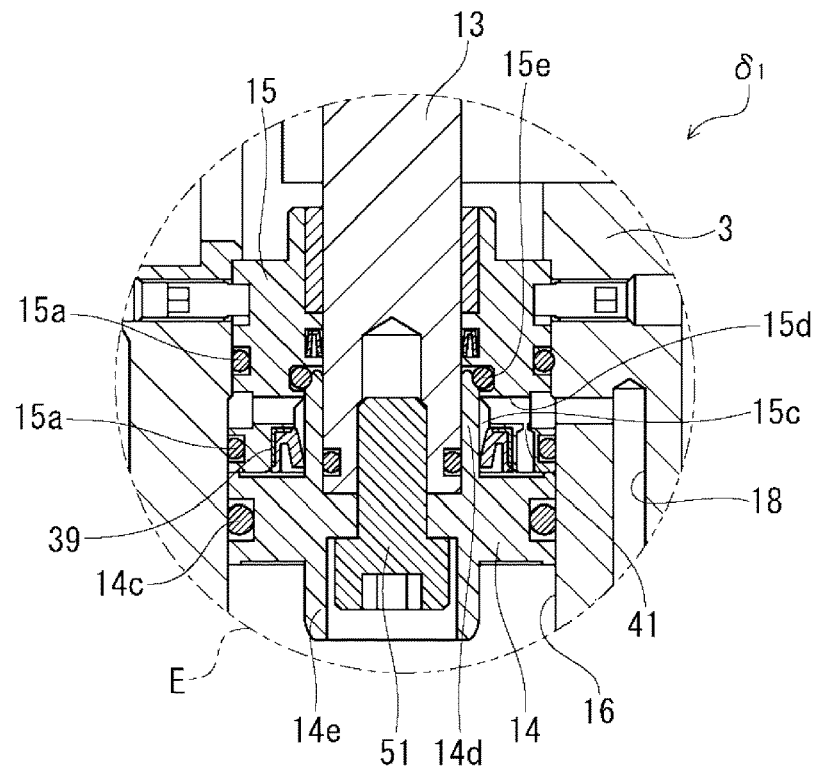
FIG. 15 is an enlarged cross-sectional view of a circle E of FIG. 13B and FIG. 14.

Next, as the mitigating mechanism in the cylinder mechanism 9, piston cushioning mechanisms $\delta_1$ and $\delta_2$ which decrease the speed of the piston 14 by the cushion gasket 39 and the orifice 41 are provided. FIG. 15 is a partially enlarged cross-sectional view of the piston cushioning mechanisms $\delta_1$ for mitigating the movement of the piston 14 at the time of full closing, depicting a range in a circle E in FIG. 13B and FIG. 14. Since the basic structure and operation of the piston cushioning mechanism $\delta_1$ are common to those of the piston cushioning mechanism γ of the other example structure of the first embodiment depicted in FIG. 9, the same portion is provided with the same reference character and is not described herein.

In FIG. 15, the piston bearing 15 is firmly fixed to an upper end the inner circumferential surface of the upper air chamber 17 via the seal material (O ring 15a). The piston rod 13 is axially supported to an insertion part opening at the center of this piston bearing 15 via an axially supporting member such as a seal material (annular V gasket). On a lower side of this insertion part in FIG. 15, a diameter-expanded part 15c with its inner diameter expanded is formed to ensure an annular gap is ensured between the insertion part and the outer circumferential surface of the piston rod 13, allowing a rod insertion part 14d of the piston 14, which will be described further below, to be inserted. Also, inside the piston bearing 15, an air flow path 15d is formed so as to be able to communicate to a flow path 18 in the housing body 3 communicating to the upper air chamber 17. This air flow path 15d is connected to the inside of the diameter-expanded part 15c.

In FIG. 15, the piston cushioning mechanism $\delta_1$ is formed of at least the cushion gasket 39 and the rod insertion part 14d, and further includes the orifice 41. Unlike the piston 14 of the first embodiment depicted in FIG. 4B, the piston 14 of the second embodiment does not have the O rings 14a and 14b on the upper surface and the lower surface, respectively. Unlike the rod insertion part 40 of the piston 45 of the other example structure (first embodiment) depicted in FIG. 8A to FIG. 8C and FIG. 9, the rod insertion part 14d of the piston 14 of the second embodiment does not have a clearance part of the cushion gasket 39, and is provided to be extended in a cylindrical shape with a substantially single outer diameter capable of sliding with an inner diameter side of the cushion gasket 39. Furthermore, unlike the pistons 14 and 45 of the first embodiment, a rod insertion part 14e is also provided to the piston 14 of the second embodiment to be extended to a lower surface side (air chamber 16 side) of the piston 14. This rod insertion part 14e does not have a clearance part of the cushion gasket 39, either, and is provided to be extended in a cylindrical shape with a substantially single outer diameter capable of sliding with the inner diameter side of the cushion gasket 39.

In FIG. 15, the length of the diameter-expanded part 15c is substantially equal to the length of the rod insertion part 14d. At a deepest part of the diameter-expanded part 15c, a cushioning part (O ring 15e) is annularly provided to receive a tip part of the annular rod insertion part 14d to cushioning. Also, unlike the orifice 41 having a substantially single inner diameter depicted in FIG. 9, in the orifice 41 of the second embodiment as depicted in FIG. 15, a hole part with a small diameter is open to an air flow path 15d side, the diameter of an air flow path is expanded from this hole part, this tapered part in a tapered shape is connected to a large-diameter part with a substantially single inner diameter, and this large-diameter part is open to the upper air chamber 17. Thus, the orifice 41 in FIG. 15 is formed of the hole part on the air flow path side, the tapered part connected to this hole part, and the large-diameter part connected to this tapered part.

Figure 16:
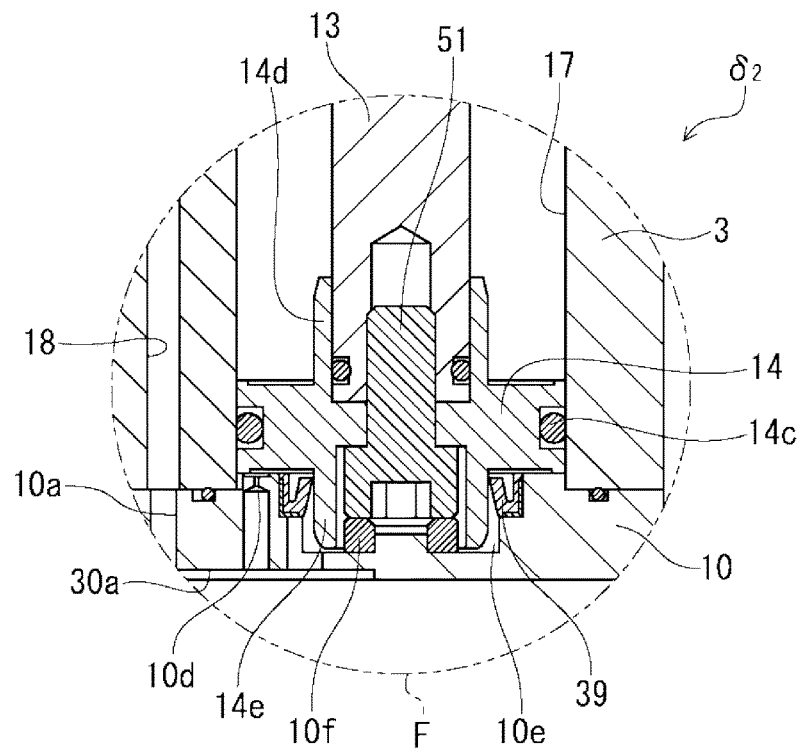
FIG. 16 is an enlarged cross-sectional view of a circle F of FIG. 14.

Next, the piston cushioning mechanism $\delta_2$ is described. FIG. 16 is a partially-enlarged cross-sectional view of the piston cushioning mechanism $\delta_2$ which mitigates the movement of the piston 14 at the time of full-open, depicting a range of a circle F of FIG. 14. Also in FIG. 12 and FIG. 14, the cylinder head 10 of this second embodiment is depicted. Since the basic structure and operation of the piston cushioning mechanism $\delta_2$ are also common to those of the piston cushioning mechanism γ of the other example structure of the first embodiment depicted in FIG. 9, the same portion is provided with the same reference character and is not described herein.

In FIG. 16, the piston cushioning mechanism $\delta_2$ is formed of at least the cushion gasket 39 and a rod insertion part 14e, and further includes an orifice 10d. In the cylinder head 10 of the second embodiment, to configure the piston cushioning mechanism $\delta_2$, the cylinder head 10 is provided with the orifice 10d which communicates between the inside of the lower air chamber 16 and the air flow path 30a of the block body 30, the cushion gasket 39, an accommodating part 10e in a columnar recessed shape that is open concentrically with this cushion gasket 39 toward the inside of the lower air chamber 16 and is capable of accommodating the rod insertion part 14e, and an annular gasket 10f capable of cushioning a bolt 51 which firmly fixes the piston 14 to a tip surface of the piston rod 13 when the piston 14 descend to a bottom dead center in the full-open state. The air flow path 30a communicates also to the inside of the accommodating part 10e.

In FIG. 16, the length (depth) of the accommodating part 10e is substantially equal to the length of the rod insertion part 14e, and the outer diameter of the gasket 10f is substantially equal to the outer shape of the bolt 51. Also, unlike the orifice 41 of the above-described piston cushioning mechanism $\delta_1$ (FIG. 15), in the orifice 10d of the piston cushioning mechanism $\delta_2$ in FIG. 16, a hole part with a small diameter is open to a lower air chamber 16 side, the diameter of an air flow path is expanded from this hole part in a tapered shape, this tapered part in a tapered shape is connected to a large-diameter part with a substantially single inner diameter, and this large-diameter part is open to the air flow path 30a. Thus, the orifice 10d of the piston cushioning mechanism $\delta_2$ is formed of the hole part on the air flow path side, the tapered part connected to this hole part, and the large-diameter part connected to this tapered part.

Figure 17:
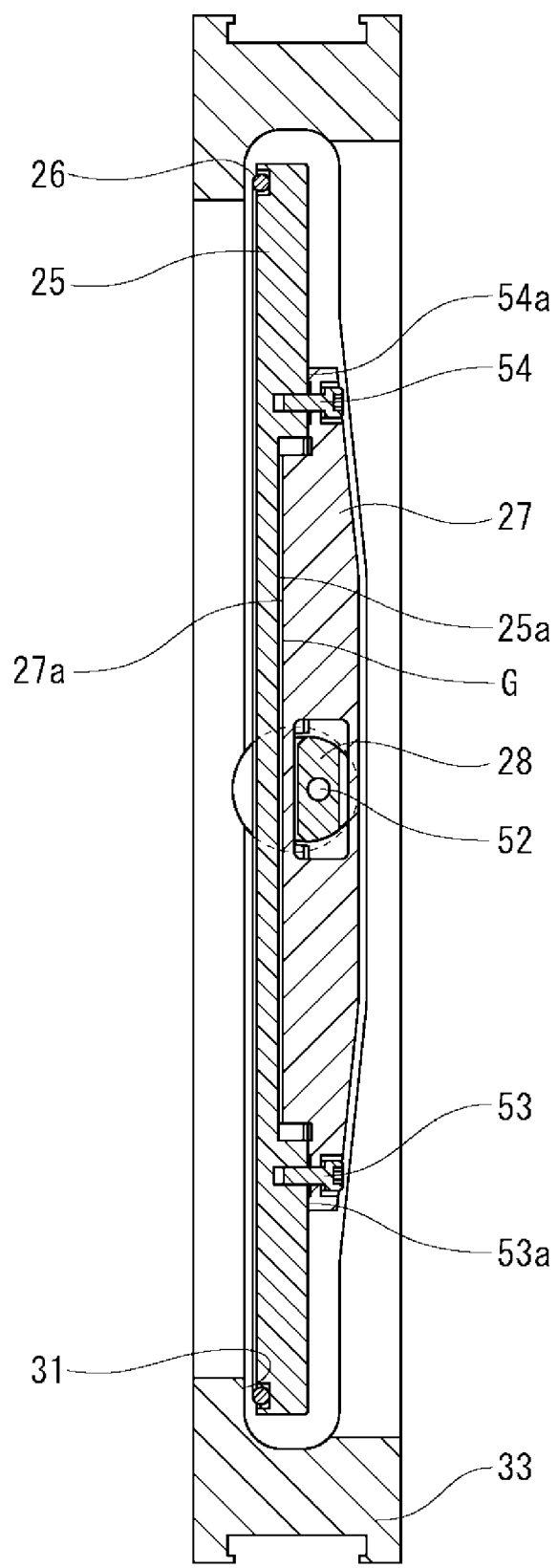
FIG. 17 is a cross-sectional view of the valve body of the second embodiment being at an upper end position of an opening stroke, the valve body cut out at a position of an X line in FIG. 14.

FIG. 17 is a cross-sectional view of the valve body 25 for use in the second embodiment, depicting a cut surface at a position of an X line of FIG. 14, with the valve body 25 being at the full-close state. As depicted in FIG. 14 and FIG. 17, the valve body 25 is firmly fixed with bolts 53 and 54 to the valve-body holder 27 firmly fixed at a tip part of the stem 28 via a bolt 52 or the like. Thus, the valve body 25 is firmly fixed to the valve-body holder 27 on fixed surfaces 53a and 54a at two locations as bilaterally symmetrical positions with respect to the stem 28. Also as depicted in FIG. 17, a clearance G is ensured between a back surface 25a of the valve body 25 and a front surface 27a of the valve-body holder 27. Here, the valve-body holder 27 is configured with stiffness where bending or a kink hardly occurs, and the clearance G is always maintained while the valve of the second embodiment is being used, which includes a case in which the valve body 25 closes the seal surface 31 in the full-close state.

Thus, when the valve body 25 is closed in the full-close state, a closing operation can be provided, which is similar to that when the valve body 25 is closed via the fixed surfaces 53a and 54a at bilaterally symmetrical locations with two stems at these positions. Also, even if the stem 28 is bent, the influence of this bending is reflected as bending of a center part of the valve body 25, and thus the entire bending of the valve body 25 can be made uniform, closing of the valve-body seal material 26 to the seal surface 31 can be made uniform, and sealability can be enhanced.

Lastly, the operation of the second embodiment is described. FIG. 13A is a side view of the housing body 3 of the second embodiment viewed from an inner side surface side. FIG. 13B is a cross-sectional view along a XIII-XIII line of FIG. 13A. FIG. 14 is a longitudinal cross-sectional view in the second embodiment when a movement of opening and closing the seal surface 31 of the body 33 is viewed from front, in which a right side indicates a full-open position of the valve body and a left side indicates a full-close state of the valve body.

Here, except the mitigating mechanism, also in the second embodiment, the movements between a right side (full-open state) and a left side (full-close state) in FIG. 14 are common to those of the first embodiment, and are thus not described herein. That is, also in the second embodiment, in the opening stroke from the full-open position to the full-close position, the cam roller 5 is engaged with the cam groove 12 (narrow-width part 12a) via the valve-body open/close driving body 2 by resilience of the elastic member 4. After the fulcrum roller 6 is locked to the stopper part 7a, the cam roller 5 as a point of effort is guided along the cam groove 12, with the fulcrum roller 6 taken as a fulcrum, thereby causing pendular L-motion movements with the valve body (seal material 26) taken as a point of load. Then, the cam roller 5 reaches the lower end part of the cam groove 12, closing of the body 33 to the seal surface 31 by the valve-body seal material 26 is completed, and the state becomes in a full-close state. The movement from the full-close state to the full-open state is reverse to the above-described movement, which is common to the first embodiment. Thus, in the following, the operation of the second embodiment is described by using FIG. 13A, FIG. 13B, and FIG. 14, mainly focusing on the operation of the mitigating mechanism.

In FIG. 13A, since the cam groove 12 of the second embodiment is provided with the bushing 12e. Thus, at the time of engagement from the tilted part 12b of the cam groove 12 to the narrow-width part 12a in the valve's L-motion movement stroke, as depicted in a two-dot-chain line in FIG. 13A, the cam roller 5 is received by the bushing 12e, thereby reducing a collision with the cam groove 12. Thus, impulsive sound and vibrations of the valve can be reduced. This movement corresponds to the movement from FIG. 6C (FIG. 7C) to FIG. 6B (FIG. 7B) in the valve of the first embodiment.

In FIG. 15, the operation of the piston cushioning mechanism $\delta_1$ is basically similar to that in the first embodiment depicted in FIG. 8A to FIG. 10. That is, when the valve body 25 goes toward a direction of valve closing and the piston 14 ascends, the rod insertion part 14d is inserted into the diameter-expanded part 15c as sliding with an inner diameter side of the cushion gasket 39. With this sliding, the ascent of the piston 14 is decelerated. Accordingly, while the cushion gasket 39 is in close contact with the outer circumferential surface of the rod insertion part 14d, the upper air chamber 17 is becoming in a hermetic state by the O ring 15a, the O ring 14c, and the cushion gasket 39, and its inner air passes through the orifice 41 via the air flow path 15d to exit to the air flow path 18. Thus, the ascent of the piston 14 is decelerated also by this air compression effect of narrowing down the outflow at the orifice 41. Thus, the piston cushioning mechanism $\delta_1$ decelerates the ascent of the piston 14 by the cushion gasket 39 and the orifice 41. While the rod insertion part 14d is not sliding with the cushion gasket 39, the inside of the upper air chamber 17 communicates to the air flow path 15d via the diameter-expanded part 15c. Thus, the state does not become in a hermetic state, and thus the above-described deceleration effect does not exert.

Here, unlike the rod insertion part 40 depicted in FIG. 9, the rod insertion part 14d does not have the small-diameter part 40b (clearance part). Thus, unlike the other example structure of the first embodiment, the deceleration effect always works by a friction force during sliding with the cushion gasket 39. In FIG. 15, any length of this rod insertion part 14d, that is, a stroke (ascent deceleration stroke) where the rod insertion part 14d and the cushion gasket 39 slide with each other, can be selected as appropriate in accordance with implementation. This ascent deceleration stroke corresponds to the length from the top dead center (full-close state) position of the piston 14 to the length of the rod insertion part 14d (diameter-expanded part 15c). Thus, if the length of this ascent deceleration stroke is set longer than the L-motion movement stroke ($L_2$) from the top dead center position (FIG. 15) of the piston 14, before the position (height) of the piston 14 in the opening stroke reaches the position (locking point) where the fulcrum roller 6 is locked to the bushing 48 (48a), sliding starts when the rod insertion part 14d reaches the cushion gasket 39. Thus, the collision of the fulcrum roller 6 with the bushing 48 can also be cushioned by the piston cushioning mechanism $\delta_1$. Conversely, if the length of the ascent deceleration stroke is set shorter than the L-motion movement stroke, the cushioning effect of the piston cushioning mechanism $\delta_1$ is not exerted when the piston 14 reaches the locking point.

In FIG. 16, the operation of the piston cushioning mechanism $\delta_2$ is basically similar to the operation of the piston cushioning mechanism $\delta_1$ of FIG. 15. That is, when the valve body 25 goes toward a direction of valve opening and the piston 14 descends, the rod insertion part 14e is inserted into the accommodating part 10e as sliding with the inner diameter side of the cushion gasket 39. With this sliding, the descent of the piston 14 is decelerated. Accordingly, while the cushion gasket 39 is in close contact with the outer circumferential surface of the rod insertion part 14e, the lower air chamber 16 is becoming in a hermetic state by the O ring 14c and the cushion gasket 39, and its inner air passes through the orifice 10d to exit to the air flow path 30a. Thus, the descent of the piston 14 is decelerated also by this air compression effect of narrowing down the outflow at the orifice 10d. Thus, the piston cushioning mechanism $\delta_2$ decelerates the descent of the piston 14 by the cushion gasket 39 and the orifice 10d. Furthermore, at the bottom dead center position of the piston 14, as depicted in FIG. 16, a gasket 10f receives the bolt 51. While the rod insertion part 14e is not sliding with the cushion gasket 39, the inside of the lower air chamber 16 communicates to the air flow path 30a via the accommodating part 10e. Thus, the state does not become in a hermetic state, and thus the above-described deceleration effect does not exert.

A stroke (descent deceleration stroke) where the rod insertion part 14e and the cushion gasket 39 slide with each other is also similar to the case of the piston cushioning mechanism $\delta_1$. That is, the descent deceleration stroke corresponds to the length from the bottom dead center (full-open state) position of the piston 14 to the length of the rod insertion part 14e (accommodating part 10e), and its length can be set as appropriate in accordance with implementation.

Meanwhile, the vacuum gate valve of the present invention can be favorably used without a movement guiding mechanism (fixed-side guiding member 21 and the movable-side guiding member 22). Thus, the movement guiding mechanism is not necessarily required.

Furthermore, the present invention is not limited to the description of the embodiments described above, and can be variously changed in a range not deviating the gist of the invention described in the claims of the present invention.

What is claimed is:

1. A vacuum gate valve comprising:
   housing bodies arranged so as to be opposed to each other;
   a valve-body open/close driving body arranged between the housing bodies to perform vertical movements and L-motion movements; and
   a stem provided with a valve body at an upper part of the valve-body open/close driving body, wherein
   each of the housing bodies has therein a piston rod which makes vertical movements by a cylinder mechanism and a cam member with a cam groove provided at an upper end of the piston rod,
   on each side of the valve-body open/close driving body, a cam roller and a fulcrum roller are provided, the cam roller being slidably guided along the cam groove,
   on an inner side of the housing body, a vertical movement guiding part which guides vertical movements of the fulcrum roller and a stopper part which locks an ascent of the valve-body open/close driving body are provided,
   a spring for causing the valve-body open/close driving body to ascend to an upper end part of an opening stroke is provided between a lower part of the valve-body open/close driving body and a fixed base part on a fixed side, and
   an elastic bushing for cushioning is attached to a narrow-width part on a valve-close side of the cam groove of the cylinder mechanism, and an elastic bushing for roller reception is attached to the stopper part which guides vertical movements of the fulcrum roller and locks an ascent of the fulcrum roller.

2. The vacuum gate valve according to claim 1, wherein a piston cushioning mechanism for deceleration formed of a cushion gasket and an orifice is provided on a valve-close side and a valve-open side inside the cylinder mechanism.

3. The vacuum gate valve according to claim 1, wherein the spring has an upper end attached to a lower recessed surface of the valve-body open/close driving body and has a lower end attached to a cylinder head of the housing body, the cylinder head being taken as the fixed base part.

4. The vacuum gate valve according to claim 1, wherein a movement guide mechanism which guides the vertical movements and the L-motion movements as valve open/close movements is provided on each side of the valve-body open/close driving body and inside each of the housing bodies.

5. The vacuum gate valve according to claim 4, wherein the movement guide mechanism is formed of a fixed-side guiding member provided to each of the housing body and a movable-side guiding member provided to the valve-body open/close driving body.

* * * * *